US012642266B2

(12) United States Patent
Vickery et al.

(10) Patent No.: US 12,642,266 B2
(45) Date of Patent: Jun. 2, 2026

(54) ADAPTABLE PEST CONTROL APPARATUS

(71) Applicant: TYTON, LLC, Bedford, TX (US)

(72) Inventors: Ethan Vickery, Colleyville, TX (US);
Jay Rasmussen, Colleyville, TX (US)

(73) Assignee: TYTON, LLC, Bedford, TX (US)

( * ) Notice: Subject to any disclaimer, the term of this
patent is extended or adjusted under 35
U.S.C. 154(b) by 9 days.

(21) Appl. No.: 18/911,688

(22) Filed: Oct. 10, 2024

(65) Prior Publication Data

US 2025/0113814 A1 Apr. 10, 2025

Related U.S. Application Data

(60) Provisional application No. 63/589,263, filed on Oct.
10, 2023.

(51) Int. Cl.
*A01M 23/00* (2006.01)
*A01M 23/16* (2006.01)

(52) U.S. Cl.
CPC .......... *A01M 23/005* (2013.01); *A01M 23/16*
(2013.01)

(58) Field of Classification Search
CPC ..... A01M 23/005; A01M 23/16; A01M 23/08
See application file for complete search history.

(56) References Cited

U.S. PATENT DOCUMENTS

| | | | | |
|---|---|---|---|---|
| 2,962,836 A | * | 12/1960 | Hughes | A01M 25/004 |
| | | | | 43/58 |
| 4,244,134 A | * | 1/1981 | Otterson | A01M 23/00 |
| | | | | 43/58 |
| 4,425,731 A | * | 1/1984 | Orlando | A01M 23/005 |
| | | | | 229/115 |
| 8,104,223 B1 | * | 1/2012 | Rodriguez | A01M 1/14 |
| | | | | 43/115 |

(Continued)

FOREIGN PATENT DOCUMENTS

KR      2021023371 A   *  3/2021   ............ A01M 23/26

OTHER PUBLICATIONS

"JT Eaton 420 Repeater Multiple Catch Mouse Trap," J.T. Eaton &
Co., Inc., https://www.webstaurantstore.com/jt-eaton-420-repeater-
multiple-catch-mouse-trap/605JT420GY.html?utm_source=bing
&utm_medium=cpc&utm_campaign=DSA%20%7C%20TEXT%
20%7C%20Purchasers&utm_term=Janitorial%20Supplies&utm_
content=Janitorial%20Supplies%20Label, May 28, 2022, accessed
Feb. 10, 2025, 13 pages.

(Continued)

*Primary Examiner* — David J Parsley
*Assistant Examiner* — Carly W. Lynch
(74) *Attorney, Agent, or Firm* — Norton Rose Fulbright
US LLP

(57) ABSTRACT

The present disclosure includes pest management appara-
tuses for trapping pests. For example, some embodiments of
the pest control apparatuses comprise a sidewall surrounding (Continued)

an interior region, the sidewall including a bottom edge and multiple inwardly-extending tabs, each tab having a bottom surface and at least a portion of each of the tab bottom surfaces being co-planar with each other, the sidewall being releasably couplable to a floor, and a lid coupled to the sidewall. The floor may be releasably coupled to the sidewall, so as to form a base, the base having a bottommost surface, wherein the floor comprises a substrate to which an adhesive layer is permanently attached, the substrate having a bottom surface that comprises the bottommost surface. The lid and the base may cooperate to form a chamber that includes the interior region.

20 Claims, 38 Drawing Sheets

(56) References Cited

U.S. PATENT DOCUMENTS

| | | | | |
|---|---|---|---|---|
| 8,302,345 | B2 * | 11/2012 | Nelson | A01M 23/08 |
| | | | | 43/67 |
| 11,259,517 | B2 * | 3/2022 | Vickery | A01M 25/004 |
| 2002/0104255 | A1 * | 8/2002 | Hobson | A01M 1/14 |
| | | | | 43/114 |
| 2003/0089024 | A1 | 5/2003 | Nelson et al. | |
| 2005/0102889 | A1 | 5/2005 | Hoyes | |
| 2016/0227753 | A1 * | 8/2016 | White | A01M 1/10 |
| 2020/0178514 | A1 * | 6/2020 | Schurman | A01M 23/30 |
| 2020/0245605 | A1 | 8/2020 | Vickery et al. | |
| 2024/0130353 | A1 * | 4/2024 | Bayne | A01M 23/005 |

OTHER PUBLICATIONS

"Rat-Size Glue Trap Cover," J.T. Eaton & Co., Inc., https://www.oldhamchem.com/rat-size-glue-trap-cover-12-count, Jun. 16, 2023, accessed Feb. 10, 2025, 3 pages.

"Trapper Plastic Tunnel," Bell Laboratories, Inc., https://diypestcontrol.com/trapper-plastic-tunel, May 29, 2023, accessed Feb. 10, 2025 15 pages.

"Tomcat® Advanced Glue Trap System Rat Size Covered Glue Traps," The Scotts Company LLC, Mar. 24, 2023, accessed Feb. 10, 2025, 3 pages.

* cited by examiner

ADAPTABLE PEST CONTROL APPARATUS

CROSS-REFERENCE TO RELATED APPLICATIONS

This application claims the benefit of priority to U.S. Provisional Patent Application No. 63/589,263, filed Oct. 10, 2023, which is incorporated by reference in its entirety.

FIELD OF INVENTION

The present invention relates generally to pest management and more particularly, but not by way of limitation, to pest management apparatuses, assemblies and/or components.

BACKGROUND

Pests such as insects, mice, rats, and other small creatures can cause problems for both residential and commercial buildings and their occupants. There are a variety of ways to deal with infestations of pests.

Applying pesticides around the boundaries of buildings or other areas is one method to deter pests from infiltrating those spaces. However, pesticide use is restricted or undesired in certain sectors and businesses. This is because some pesticides can be hazardous to humans and are inappropriate for use in sensitive environments such as food preparation areas, childcare centers, hospitals, and nurseries. Moreover, applying sprays may not be feasible in areas that are difficult to access.

An alternative approach to pest control, without resorting to pesticides, involves using devices like traps. These traps often use adhesive surfaces to capture pests, but they can become visually unpleasant as they collect more pests. These traps may also have a capture limit, requiring maintenance or replacement once they reach capacity.

SUMMARY

Additionally, in both residential and commercial settings, there is a need for a pest management device that is both versatile and selective. Traditional pest control methods often suffer from a lack of specificity, sometimes capturing non-target species and causing unnecessary harm. In addition, fluctuating pest populations of different sizes and types require a flexible approach that can adapt without needing multiple kinds of traps. An all-in-one solution can lead to long-term cost savings, especially in commercial settings where a broad spectrum of pests might need to be managed. Moreover, there is an increasing public and regulatory demand for humane and environmentally-friendly pest management solutions. A device with controlled access minimizes the potential harm to non-target animals. This is not only humane but also environmentally responsible, making the device more publicly and ethically acceptable. Further a device with adaptable features allows for easy adjustments to meet local or federal regulations concerning pest control methods. This is particularly useful for commercial applications where compliance with multiple sets of rules is often necessary.

The present pest management apparatuses include a lid configured to be coupled to a sidewall surrounding an interior region, where the sidewall includes a bottom edge and multiple inwardly-extending tabs, each tab having a tab bottom surface and at least a portion of each of the tab bottom surfaces being co-planar with each other, the sidewall being releasably couplable to a floor. The lid is in some configurations permanently coupled (such as through a living hinge) to the sidewall; or in other configurations is or can be removably coupled (such as through interfering structures like tabs and openings) to the sidewall.

In some embodiments of the pest management apparatuses the floor includes a substrate having a bottom surface to which an adhesive layer is permanently attached, where the adhesive and substrate, in at least some embodiments, take the form of a glue board that serves as the bottom of the pest management apparatus. Such apparatuses also include a floor releasably coupled to the sidewall, the floor and sidewall forming a base, the base having a bottommost surface (excluding any handle extending away from the base) that comprises the bottom surface, and a lid coupled to the base such that the lid and the base cooperate to form a chamber that includes the interior region.

Some of the present pest management apparatuses include a sidewall releasably attached to an adhesive permanently affixed to a substrate, where the adhesive and substrate, in at least some embodiments, take the form of a glue board that serves as the bottom of the pest management apparatus. Such apparatuses also include a lid that can be permanently (such as through a living hinge) or removably (such as through interfering structures like tabs and openings) coupled to the sidewall. When use of the apparatus is complete, the glue board can be removed from the sidewall (by unsticking the two from each other) and replaced with another glue board; alternatively, the entire apparatus may be appropriately disposed of.

Some of the present pest management apparatuses comprise a sidewall, a floor releasably coupled to the sidewall, the floor and sidewall forming a base, the base having a bottommost surface (excluding any handle extending away from the base), and a lid coupled to the base such that the lid and the base cooperate to form a chamber; wherein the floor comprises a substrate to which an adhesive layer is permanently attached (and to which the sidewall is releasably coupled), the substrate having a bottom surface that comprises the bottommost surface. The lid may transition between open and closed positions (and vice-versa). More specifically, such transitions may be performed without damaging any aspect of the apparatus.

Some of the present pest management apparatuses comprise a sidewall; a floor releasably coupled to the sidewall, the floor and sidewall together forming a base; and a lid coupled to the base; wherein the floor comprises a glue board and no other structure positioned parallel to and beneath the glue board.

Some embodiments of the present pest management apparatuses comprise a sidewall; a floor releasably coupled to the sidewall, the floor and sidewall together forming a base; and a lid coupled to the base; wherein the floor comprises a substrate to which an adhesive layer is permanently attached, and the pest management apparatus is configured so that no other structure thereof is positioned beneath the floor when the pest management apparatus is in use.

In some of the present pest management apparatuses, the adhesive layer is configured to attract pests (e.g., via a scent or otherwise).

In some embodiments of any of the foregoing apparatuses, the lid is coupled to the sidewall via a living hinge and is moveable relative to the base between an open position and a closed position. In other embodiments, the lid is coupled to the base via a snap-on mechanism.

In some embodiments, the lid comprises one or more openings. In some embodiments, each such opening is funnel-shaped. In some embodiments, each such opening extends between a top (or outer) surface of the lid and a bottom (or inner) surface (the underside) of the lid, and more specifically between a lid top surface opening and a lid bottom surface opening, where the lid top surface opening is larger (e.g., larger in diameter) than the lid bottom surface opening. In some embodiments the lid comprises one or more rectangularly-shaped openings (e.g., two such openings).

In some embodiments, the lid comprises a lid sidewall. In some embodiments, the lid comprises a resilient lip that extends from an edge of at least a portion of the lid sidewall. In some embodiments, the lid sidewall comprises a left lid sidewall and a right lid sidewall. In some embodiments, an inner surface of the lid comprises a recess extending from the right lid sidewall to the left lid sidewall. In some embodiments the top surface of the lid comprises a protrusion corresponding to the recess. In some embodiments, the protrusion comprises one or more openings.

In some embodiments, the sidewall comprises a left sidewall and a right side wall. In some embodiments, the base comprises one or more arch-shaped openings defined at least in part by the sidewall. Further, in some embodiments, the base comprises two or more polygon-shaped openings such that the right sidewall and the left sidewall each comprise at least one of the two or more polygon-shaped openings.

In some of the present pest management apparatuses, the base comprises a sidewall with multiple inwardly-extending tabs such that the tabs are disposed within the chamber. Each of the multiple inwardly-extending tabs may be positioned at a lowermost portion of an arch-shaped opening or a polygon-shaped opening(s) such that a portion of the bottom surface of each tab touches the floor. Further, in some embodiments, a portion of the bottom surface of each of the tabs does not touch the floor.

In some of the present pest management apparatuses, the base comprises multiple tabs, each extending from the sidewall such that the tabs are disposed within the chamber. Each of the tabs may be positioned at a lowermost portion of an arch-shaped opening or a polygon-shaped opening(s) such that a proximal portion of each tab touches the floor. Further, in some embodiments, a portion (e.g., a terminal, or distal, portion) of each of the tabs extends away from the floor.

In some embodiments in which the lid is coupled to the base, such as via a snap-on mechanism, the lid comprises a left tab and a right tab, each comprising a portion (e.g., a tooth) that extends toward the chamber. In some embodiments, each tooth is configured to fit through at least one of the polygon-shaped openings such that the tooth interferes with the sidewall to resist separation of the lid and the base when the lid and the base are moved (e.g., pulled) in opposite directions.

Some embodiments of the present pest management apparatuses also include one or more tabs at least partially disposed within the recess of certain embodiments of the lid. In some such embodiments, at least a portion of each tab aligns with at least a portion of an arch-shaped opening, e.g., to such an extent that certain pests, such as rodents, are not able to enter the pest management apparatus (e.g., the chamber) through the arch-shaped opening. In some embodiments, each tab is formed integrally with the lid and configured to be broken off from the lid, such as through a twisting motion or through bending the tab relative to the lid, such that otherwise blocked pests may enter the chamber through the relevant arch-shaped opening. In other embodiments, each tab has a portion that is positioned in one of the one more openings in the protrusion of the lid and coupled to the lid through a friction fit, the tab being removable from the lid by pulling the tab away from the lid.

In some of the present pest management apparatuses, the lid comprises a slit or opening. In some such embodiments, a top edge portion of the sidewall comprises a portion (e.g., a tooth) that extends away from the chamber. In some embodiments, the tooth is configured to fit into the slit such that it interferes with the lid when the lid is on the closed position to resist separation of the lid and base in response to movement of (e.g., pulling) the lid and the base in opposite directions. Further, in some embodiments, the lid comprises one or more protrusions that are configured to cooperate with the sidewall to secure the lid to the base.

In some embodiments the base comprises a tab (e.g., a nonlinear tab) that extends away (e.g., laterally away) from the chamber.

The terms "a" and "an" are defined as one or more unless this disclosure explicitly requires otherwise.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, an apparatus or component thereof that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale, unless otherwise noted, meaning that in each of the figures the sizes of the elements are accurate relative to each other at least for the depicted embodiments.

DETAILED DESCRIPTION OF ILLUSTRATIVE EMBODIMENTS

Figure 1:
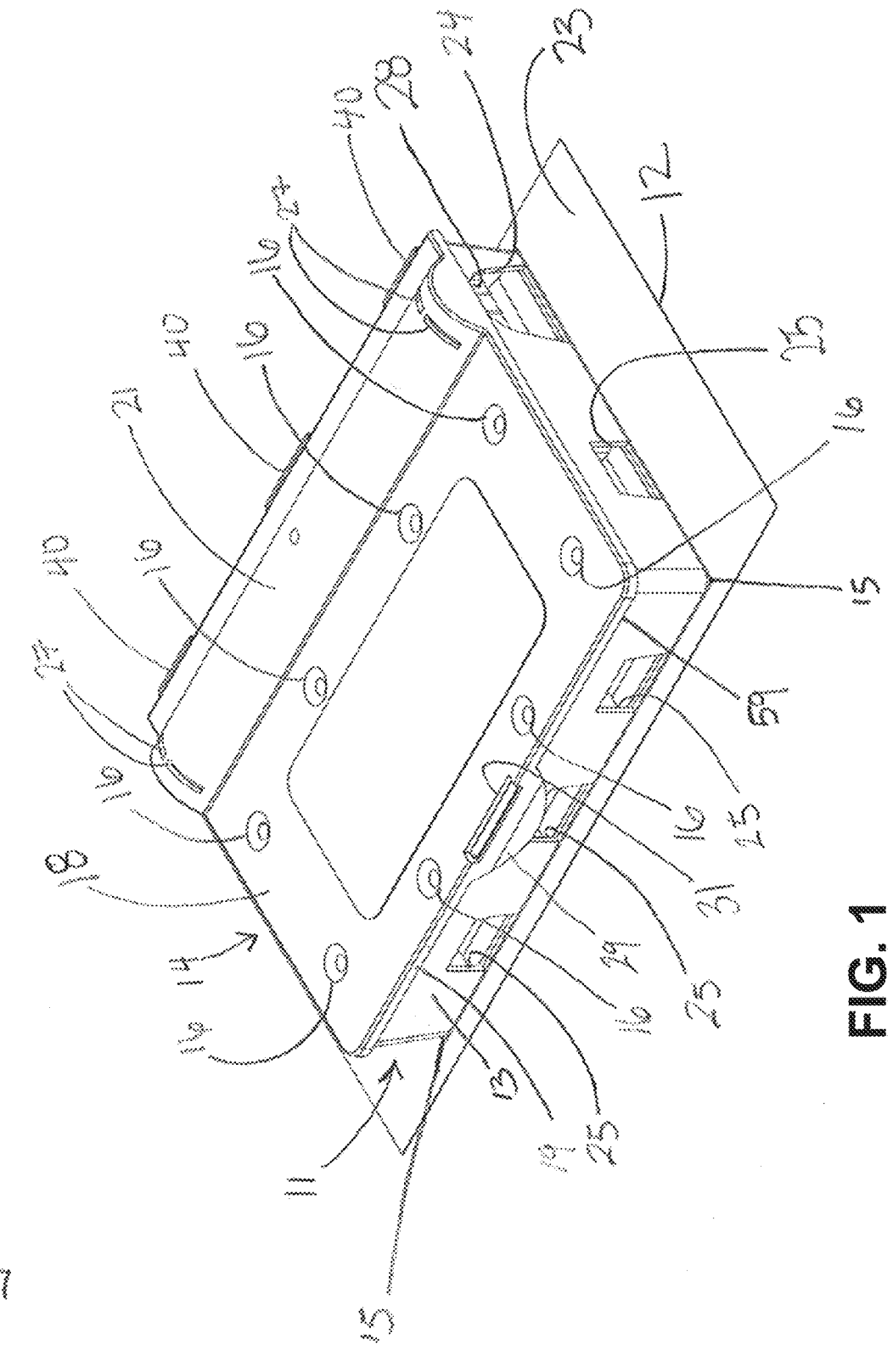
FIG. 1 is an isometric perspective view of a first embodiment of one of the present pest management apparatuses in the closed position.

Referring now to the drawings, shown therein and designated by the reference numeral 10a is a first embodiment of the present pest management apparatuses. As reflected in FIGS. 1-8, apparatus 10a comprises base 11 and lid 14 that is coupled to the base 11. Base 11 comprises (e.g., is formed by) floor 12 releasably coupled to sidewall 13. The floor 12 comprises substrate 23 to which adhesive layer 15 is permanently attached—in other words, floor 12 may take the form of a glue board. Substrate 23 has bottom surface 53 that comprises the bottommost surface of floor 12. In some configurations, the portion of the substrate that extends laterally beyond the adhesive layer may be removed (e.g., cut off) and/or configured to be removable from the apparatus and/or removed prior to, during, or after use of the apparatus. Such removability may, for example, be facilitated by perforating the substrate near the perimeter of the adhesive layer (not shown), so that the excess substrate can be more easily removed.

As shown in the figures, the shape of the outer perimeter of adhesive layer 15 is the same as or similar to the shape of the outside of the bottom edge of sidewall 13, such that little if any portion of adhesive layer 15 sticks out past the outside of the bottom edge of sidewall 13 after sidewall 13 has been placed against (and releasably attached to) adhesive layer 15 of floor 12. Adhesive layer 15 is sufficiently sticky that after sidewall 13 is releasably attached thereto, sidewall 13 and any lid attached to sidewall 13 will remain attached to floor 12 during normal use of apparatus 10a (e.g., during shipment and placement of the apparatus in a desired location for catching pests) but may be removed from floor 12 after the desired use is complete (e.g., after a sufficient number of pests have been caught via adhesive layer 15) and apparatus 10a is replaced with a new floor 12 and re-used. Adhesive layer 15 may be configured to attract and immobilize pests such that pests (e.g., insects, mice, and/or rats) that enter apparatus 10a through an opening of base 11 thereof and travel onto the adhesive of floor 12 become trapped thereon. Lid 14 is coupled to base 11 with a living hinge having multiple living hinge portions 40 such that lid 14 is moveable relative to base 11 between closed and open positions (see, e.g., FIGS. 1-2). In other embodiments (not shown), the lid and sidewall may be coupled with a hinge having multiple hinge portions that involve lid and sidewall portions that couple together through a snap-fit or the like but are not molded together to form a living hinge. Sidewall 13 is preferably molded from a suitable plastic material as an integral unit. In the closed position, base 11 and lid 14 cooperate to define chamber 30 (see, e.g., FIG. 2).

Lid 14 comprises one or more openings 16 (e.g., eight openings 16) that begin at inner surface 17 of lid 14 and progressively expand outward in diameter to top surface 18 of lid 14. The funnel shape of openings 16 is configured to better direct insects into apparatus 10a generally, and chamber 30 specifically, than if the openings had the same shapes in both the inner and top surfaces of the lid. Lid 14 comprises lid sidewall 19 spanning the front and left and right sides of the lid, but not the back. Lid sidewall 19 comprises left lid sidewall 19a and right lid sidewall 19b (see, e.g., FIGS. 4-7). The lid's inner surface 17 comprises recess 20 extending from right lid sidewall 19b to left lid sidewall 19a. The lid's top surface 18 comprises protrusion 21 that corresponds to recess 20.

Figure 2A:
FIG. 2A is an isometric perspective view of the apparatus of FIG. 1 in the open position.
Figure 2B:
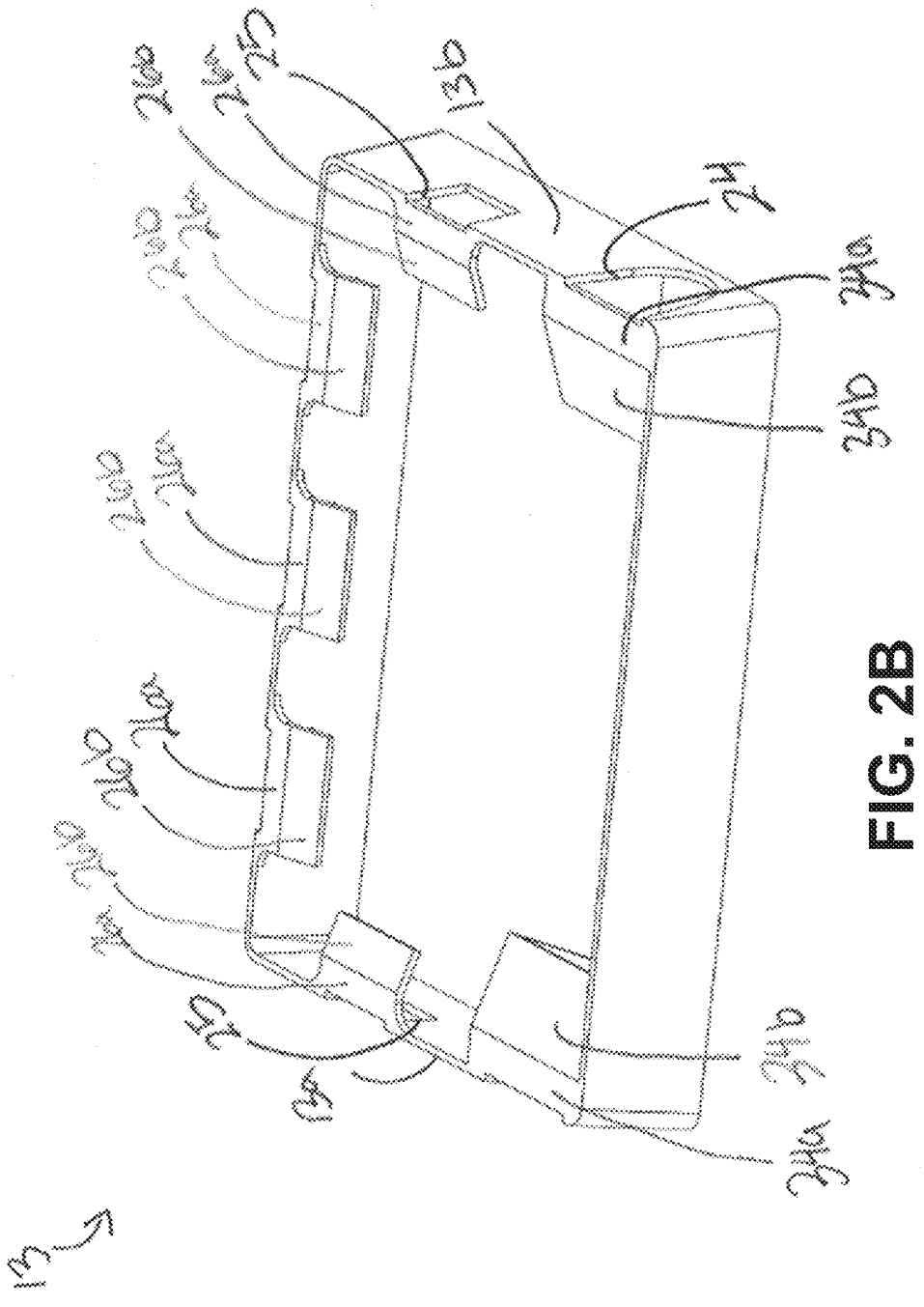
FIG. 2B is a bottom perspective view of the sidewall of the apparatus of FIG. 2A.
Figure 3:
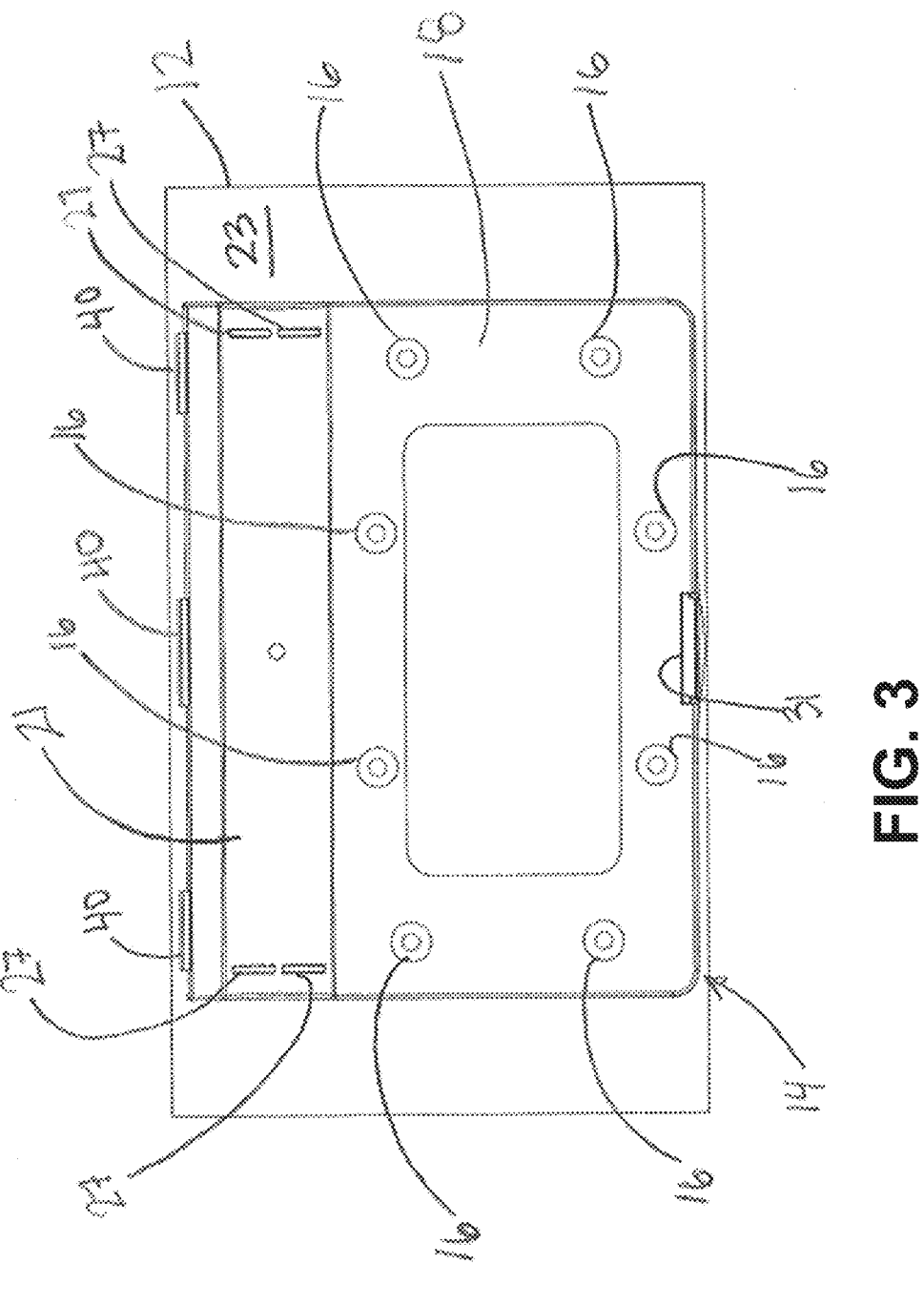
FIG. 3 is a top view of the apparatus of FIG. 1 in the closed position.

Base 11 comprises one or more arch-shaped openings 24, or openings with a curved shape along the top of each opening, defined at least in part by sidewall 13 (e.g., two arch-shaped openings as shown in, e.g., FIG. 2). Sidewall 13 surrounds an interior region and comprises left sidewall 13a and right sidewall 13b, and one arch-shaped opening 24 is positioned in each of left sidewall 13a and right sidewall 13b, both such openings being nearer the back of the sidewall than the front of the sidewall. Base 11 may also comprise two or more polygon-shaped openings 25 such that left sidewall 13a and right sidewall 13b each have at least one of polygon-shaped openings 25 and the front of sidewall 13 has three such openings (see, e.g., FIG. 2).

Sidewall 13 includes multiple inwardly-extending tabs such that each tab is disposed within chamber 30 when the sidewall is coupled to the floor and the lid is in the closed position (e.g., apparatus 10*a* includes seven such tabs). Each inwardly-extending tab has a tab bottom surface and at least a portion of the tab bottom surfaces are co-planar with each other (see e.g., FIG. 2A). Each of the tabs is positioned at a lowermost portion of either an arch-shaped opening 24 or a polygon-shaped opening 25. Each of tabs 26 positioned at a lowermost portion of a polygon-shaped opening 25 has first (e.g., proximal) portion 26*a* where the tab bottom surface is in contact with floor 12 and serves to keep the sidewall secured to the adhesive layer of the floor, and second (e.g., distal) portion 26*b* that extends away from floor 12 (e.g., at a non-vertical angle to the floor) where the tab bottom surface does not touch floor 12. Each of tabs 34 positioned at a lowermost portion of an arch-shaped opening 25 has first (e.g., proximal) portion 34*a* that, like portion 26*a* of each tab 26, has a tab bottom surface that is in contact with floor 12 and serves to keep the sidewall secured to the adhesive layer of the floor, and second (e.g., distal) portion 34*b* that, like portion 26*b* of each tab 26, extends away from floor 12 (e.g., at a non-vertical angle to the floor) such that the tab bottom surface of portion 26*b* does not touch floor 12. As reflected in, e.g., FIG. 4, the bottom of each of the arch-shaped openings and the polygon-shaped openings is floor 12 and, more specifically, adhesive layer 15 of the floor.

Figure 4:
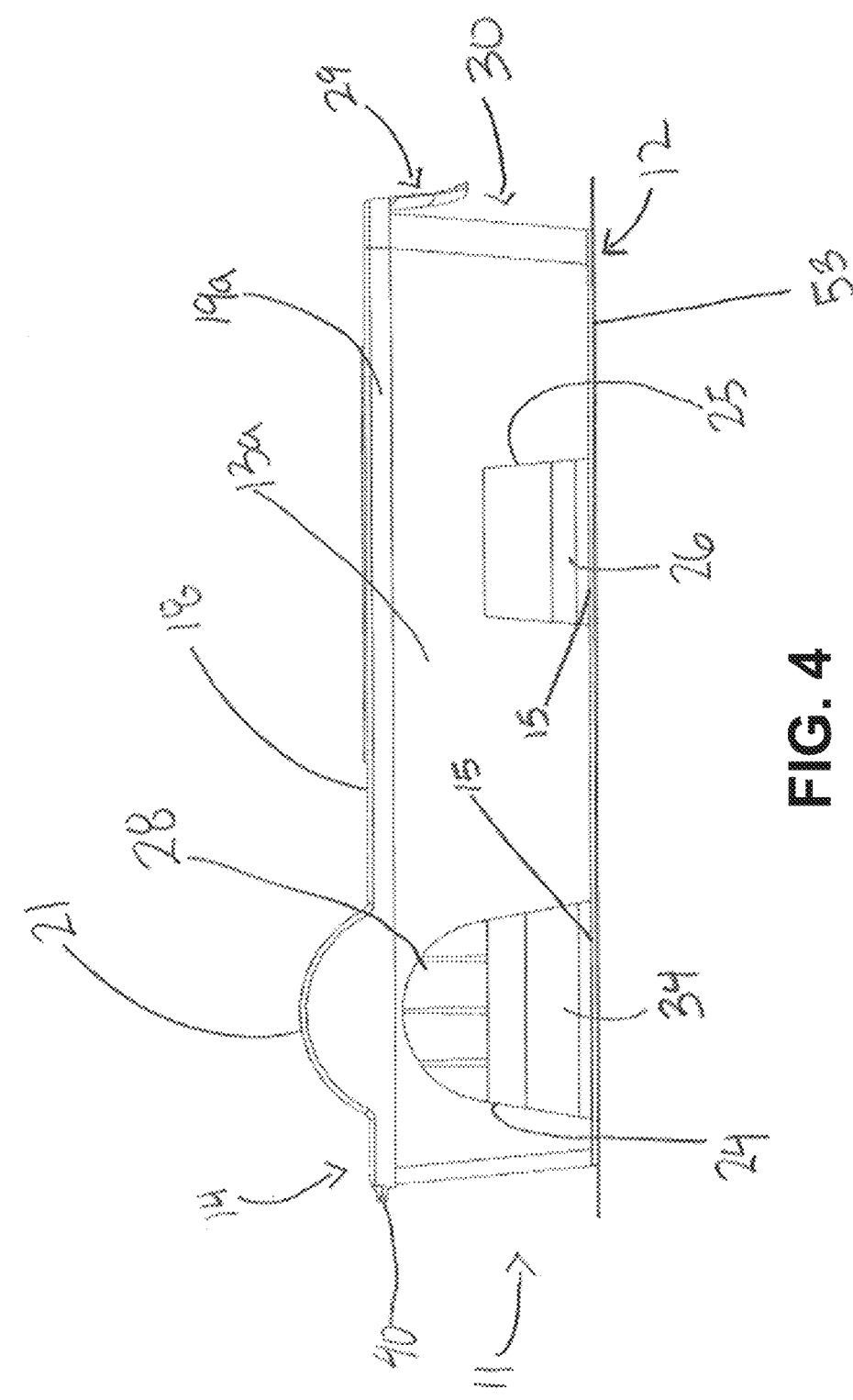
FIGS. 4-7 are left, right, front and back views, respectively, of the apparatus of FIG. 1.
Figure 5:
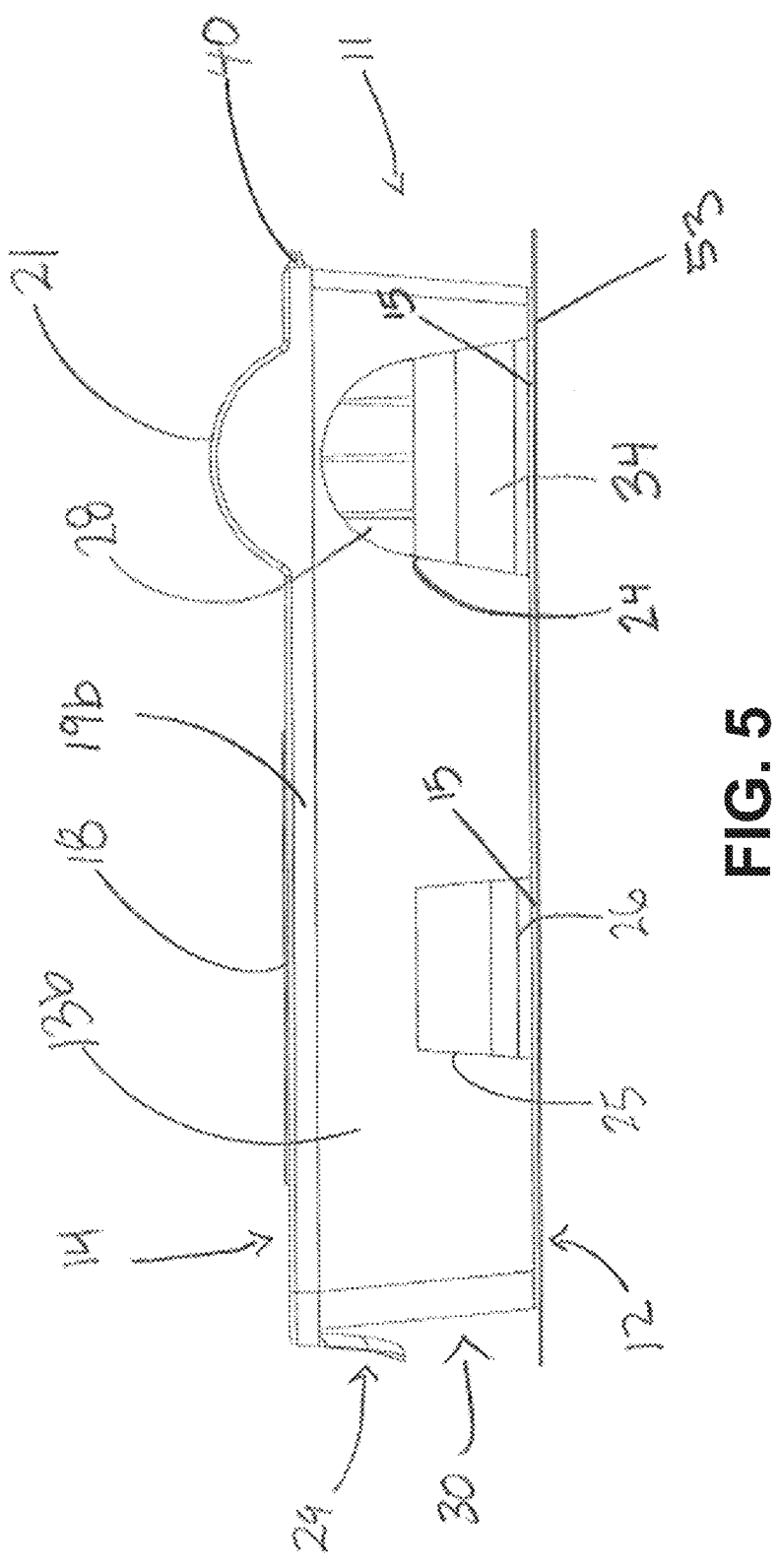
Figure 6:
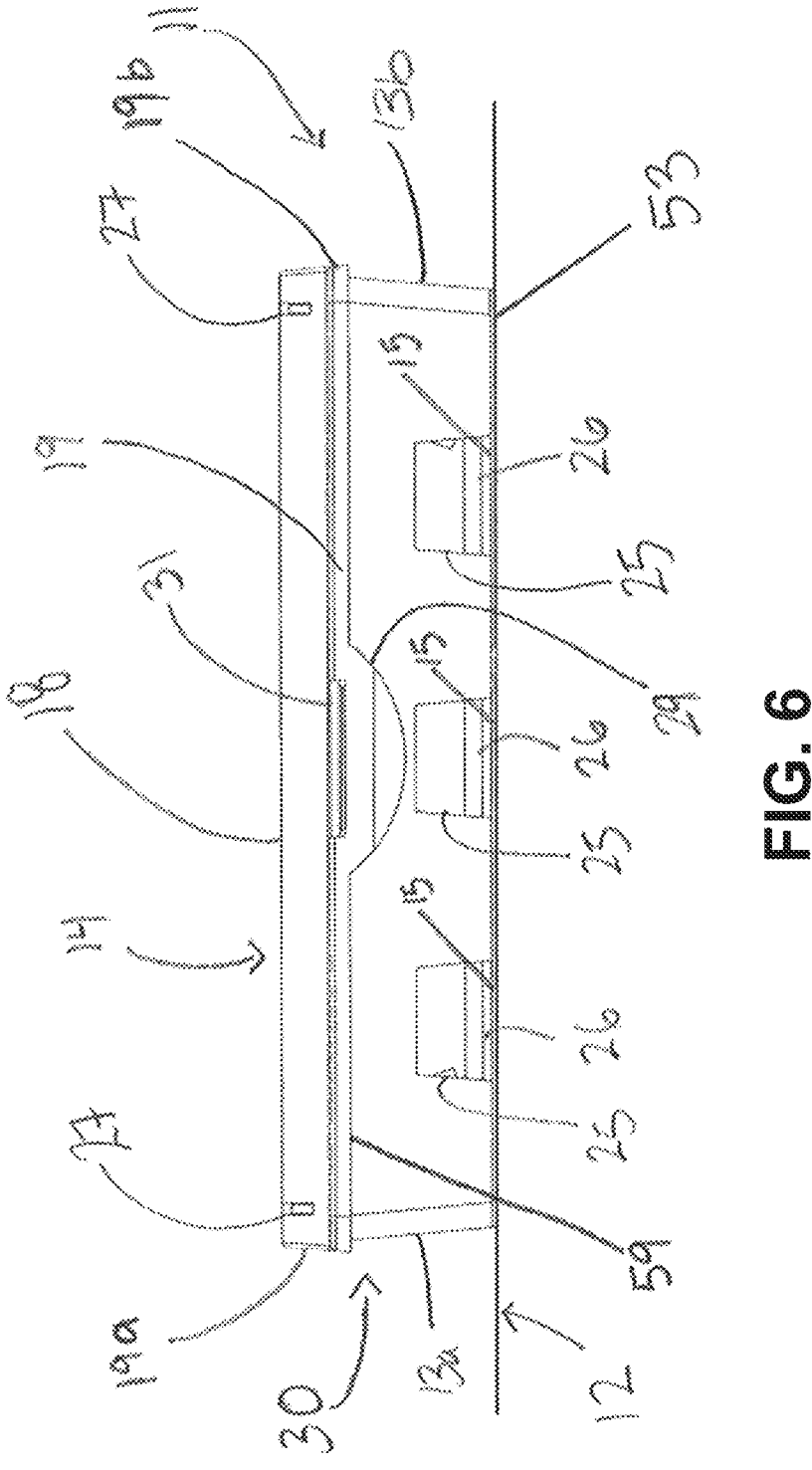
Figure 6:
Figure 7:
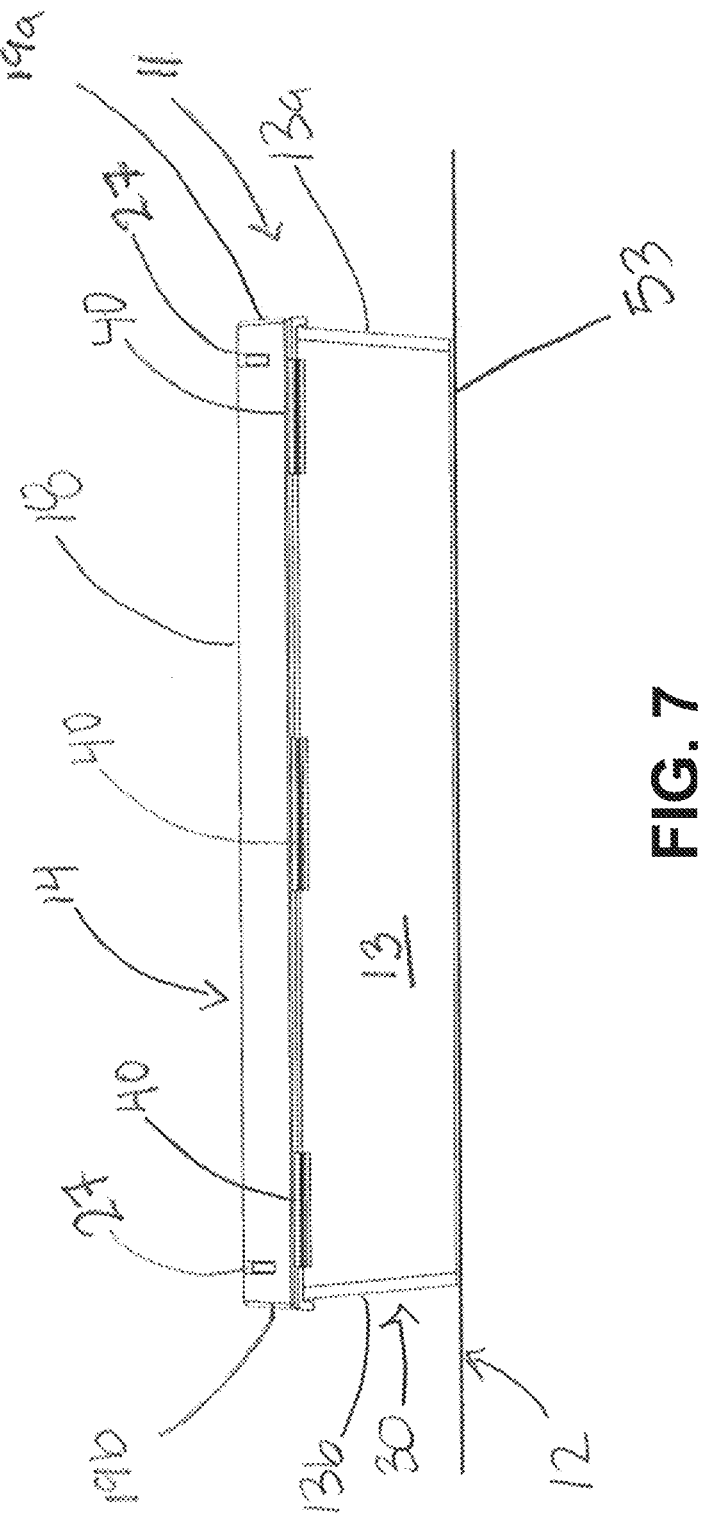
Figure 7:
Figure 8:
FIG. 8 is a top view of the apparatus of FIG. 1 in the open position.
Figure 9:
FIG. 9 is an isometric perspective view of a second embodiment of the present pest management apparatuses in the closed position, the second embodiment differing from the first embodiment only with respect to the configuration of the lid and the presence of tabs.
Figure 10:
FIG. 10 is an isometric perspective view of the apparatus of FIG. 9 in the open position.
Figure 11:
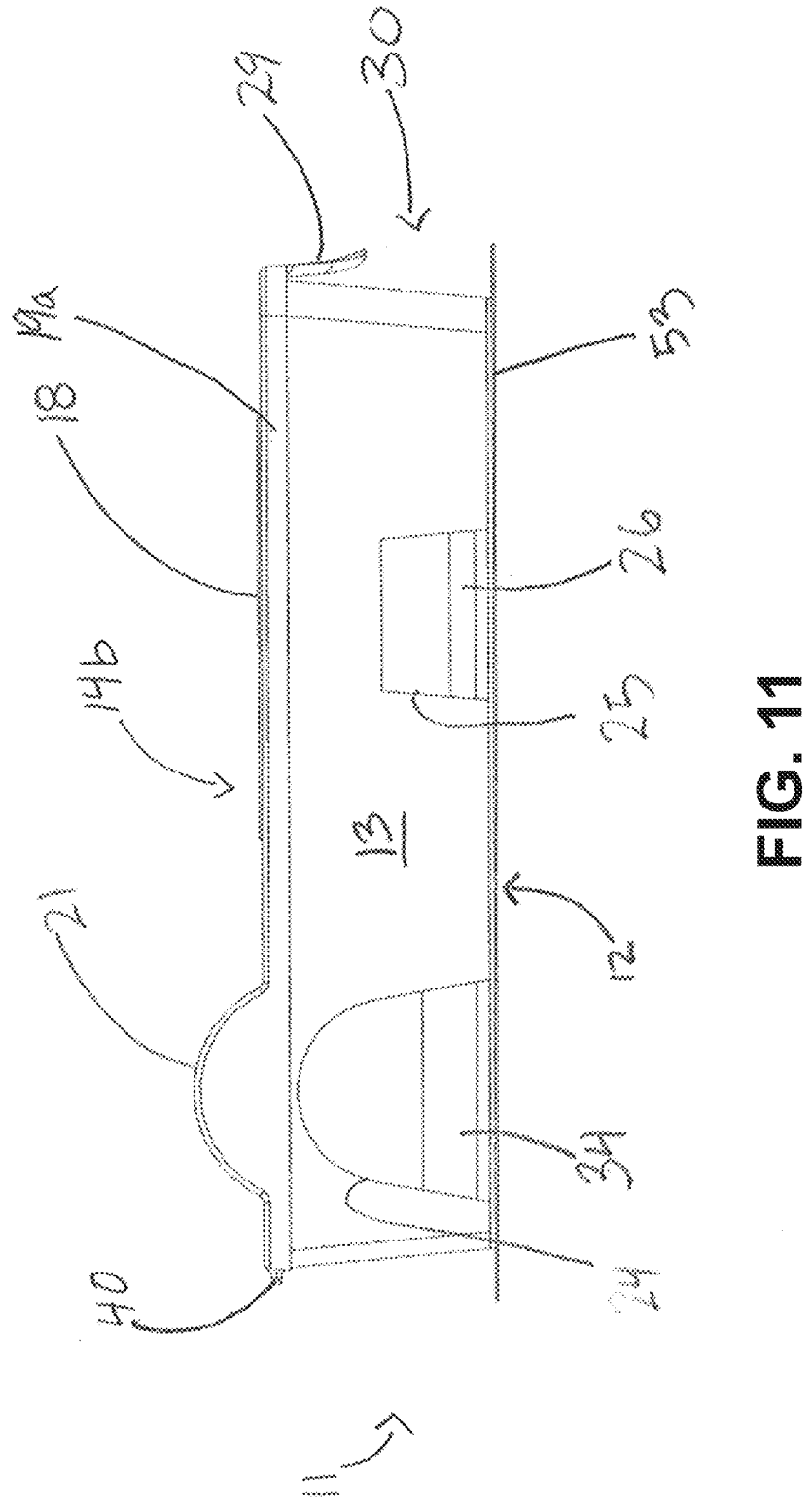
FIGS. 11-14 are left, right, front and back views, respectively, of the apparatus of FIG. 9.
Figure 12:
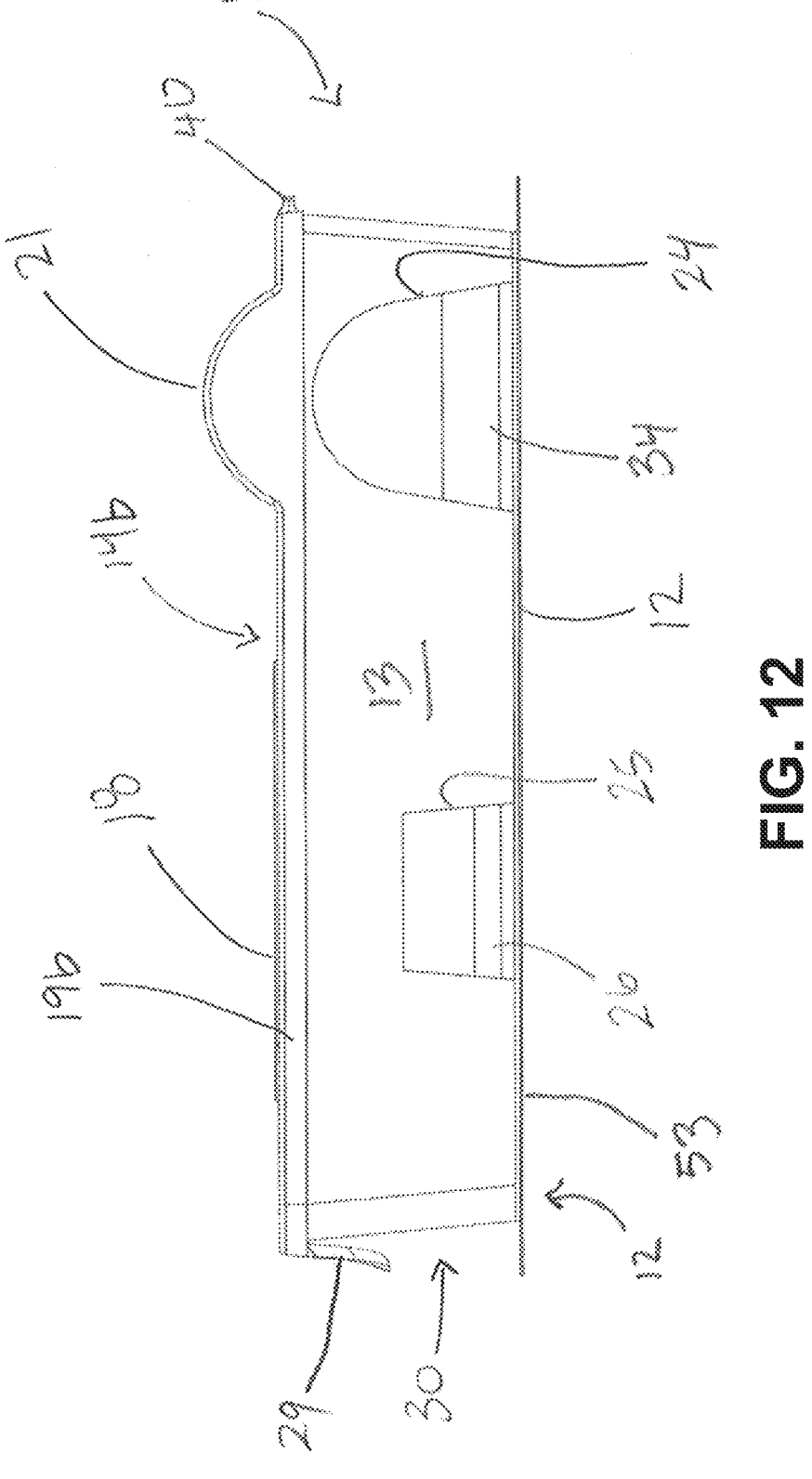
Figure 13:
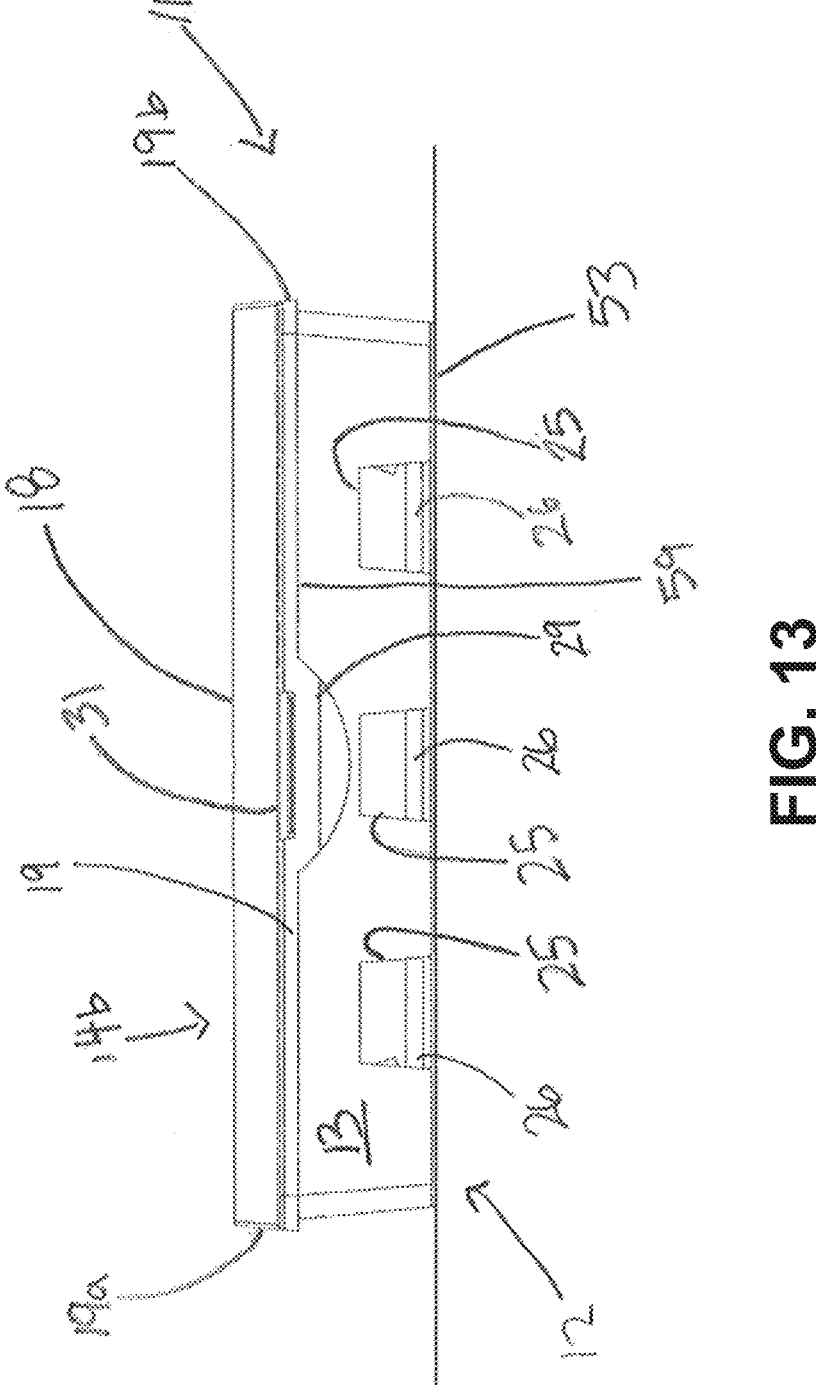
Figure 14:
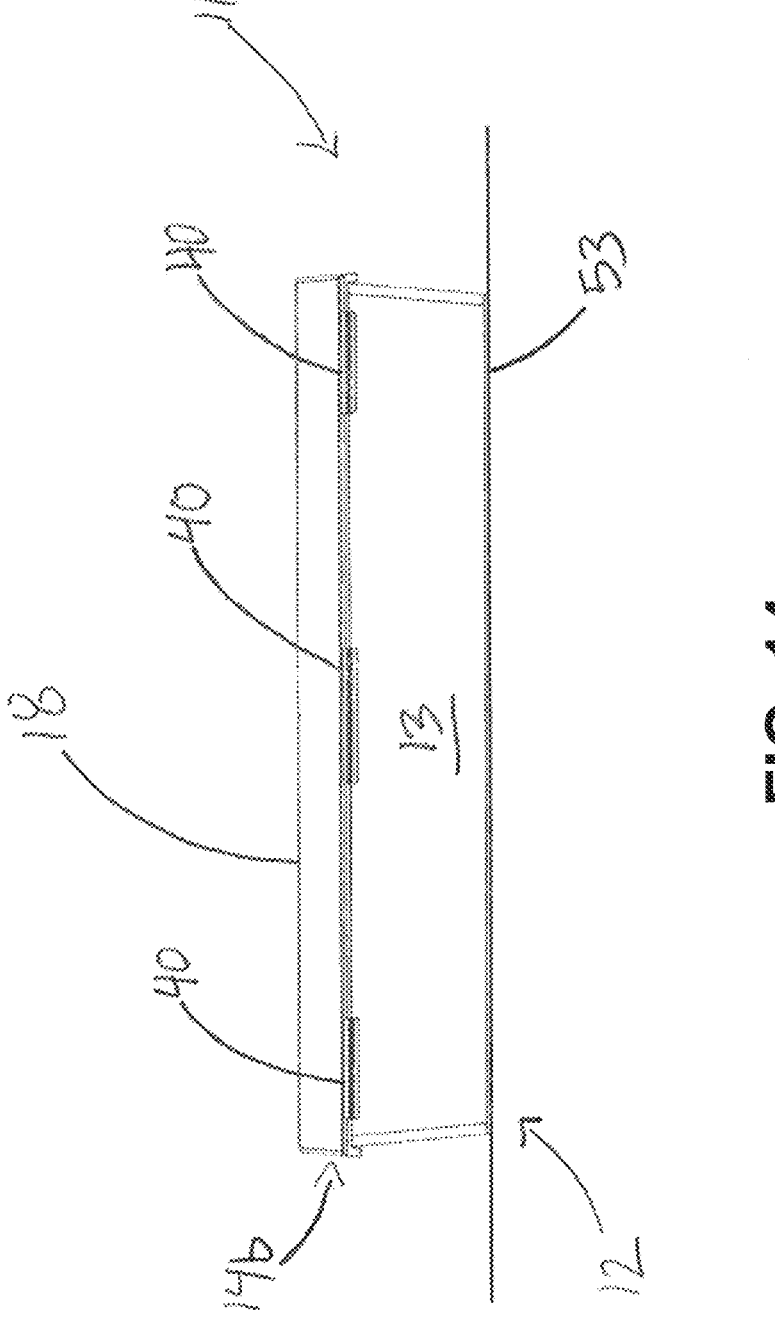
Figure 14:
Figure 15:
FIG. 15 is a top view of the apparatus of FIG. 9 in the closed position.
Figure 16:
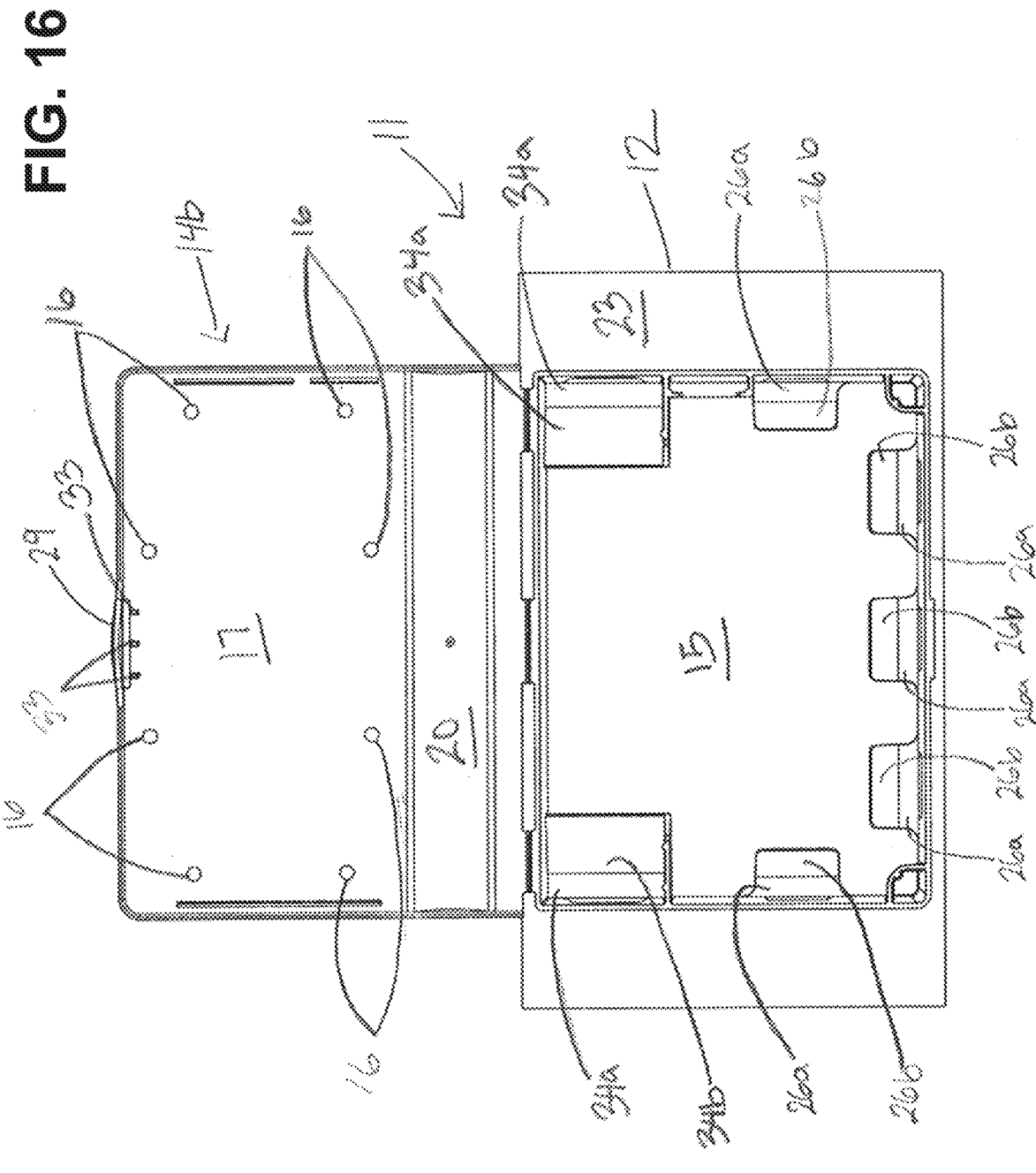
FIG. 16 is a top view of the apparatus of FIG. 9 in the open position.
Figure 17:
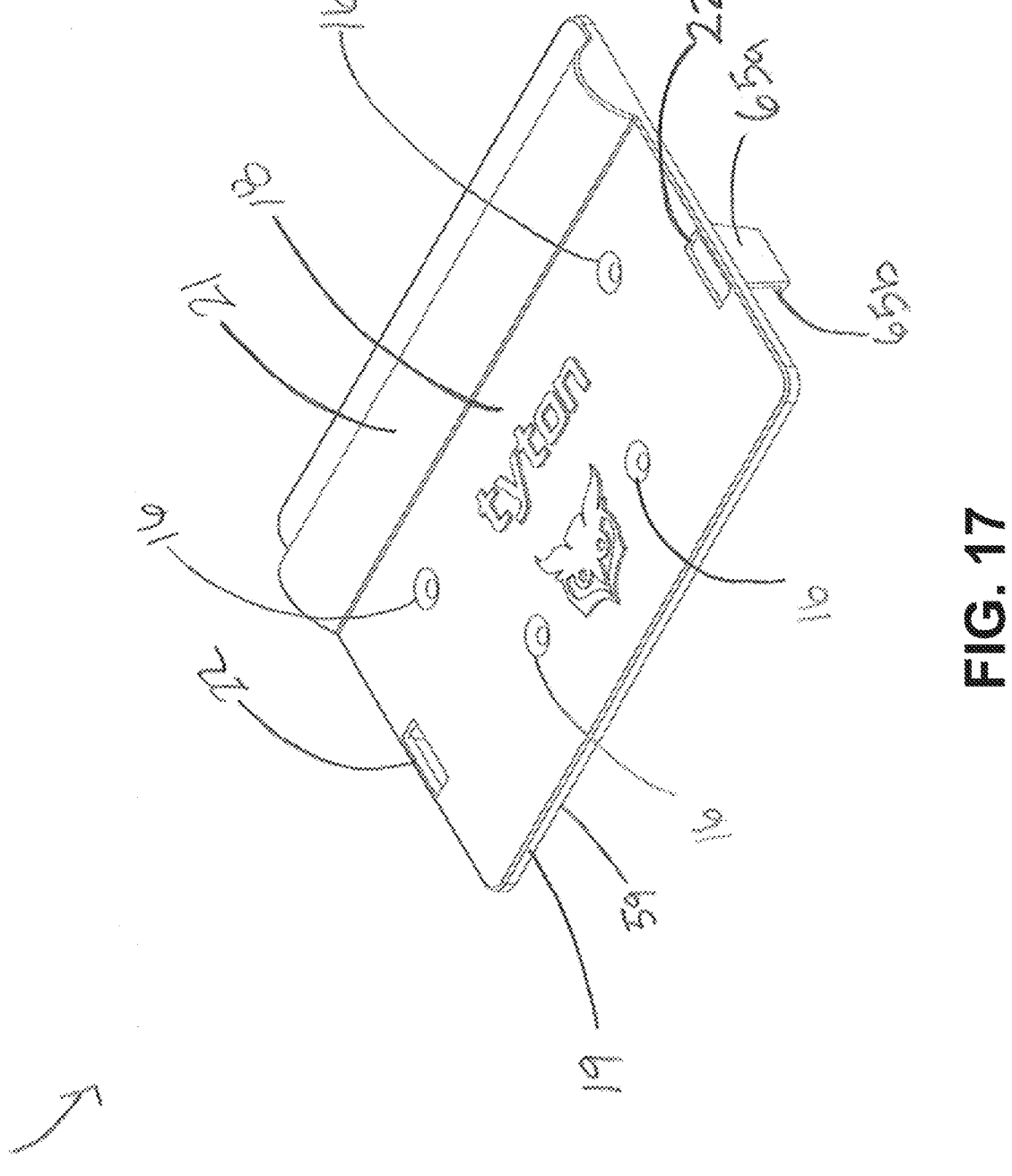
FIG. 17 is an isometric perspective view of an alternate (e.g., snap-on) lid that can be used with the base of the first embodiment.
Figure 18:
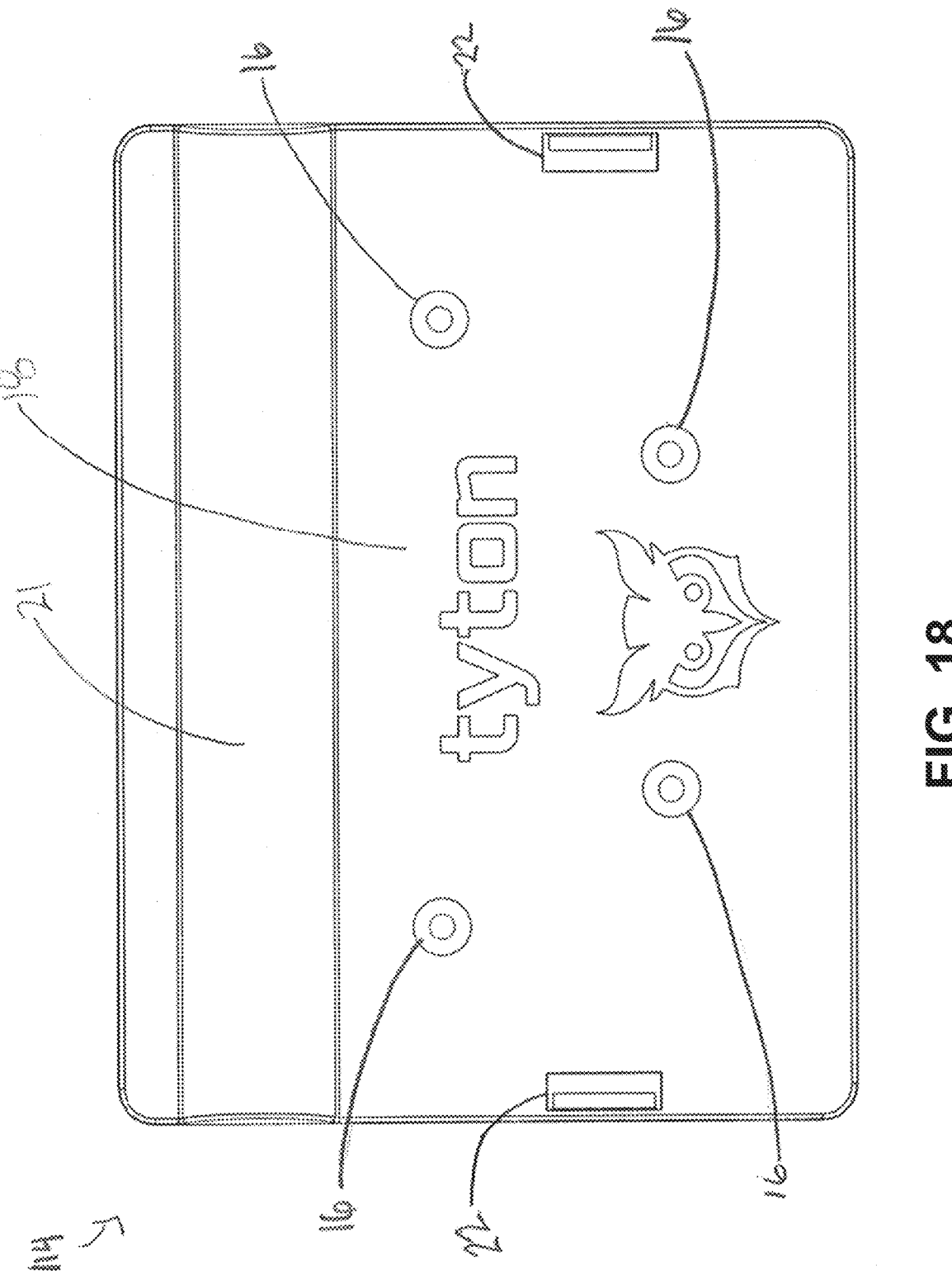
FIG. 18 is a top view of the snap-on lid of FIG. 17.
Figure 19:
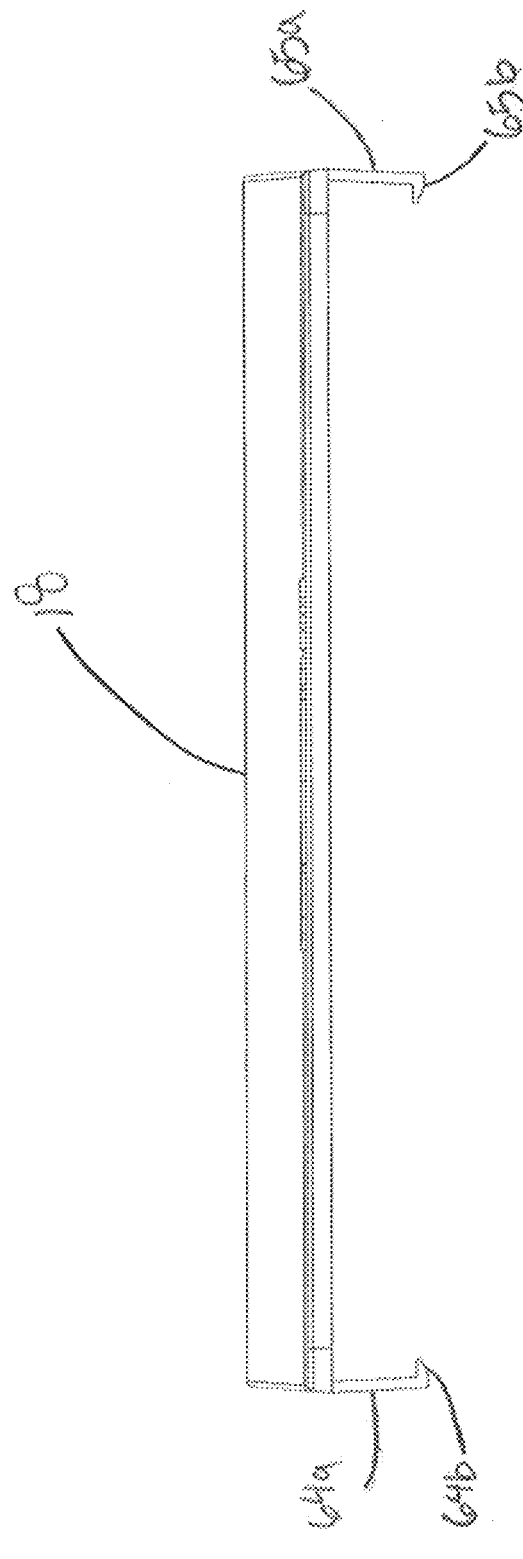
FIGS. 19-22 are front, back, left, and right, views, respectively, of the snap-on lid of FIG. 17.
Figure 20:
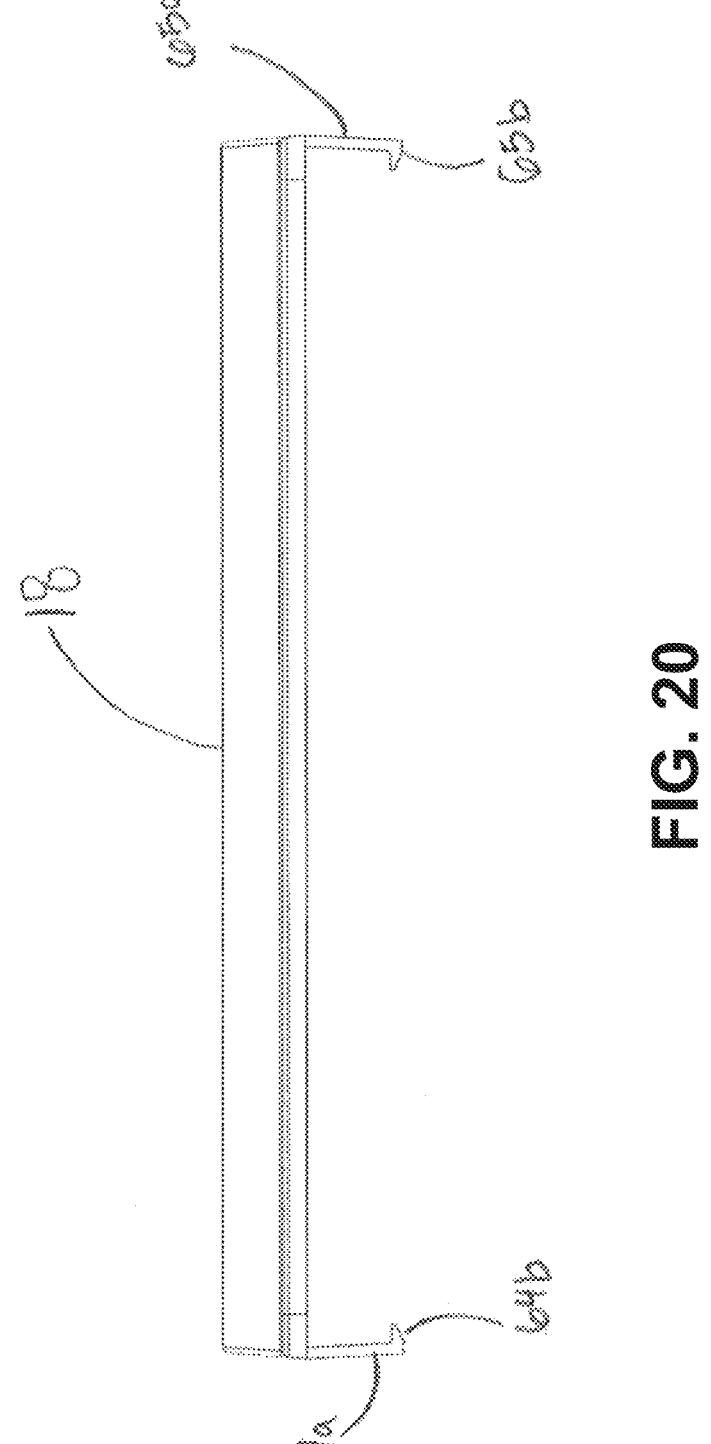
Figure 21:
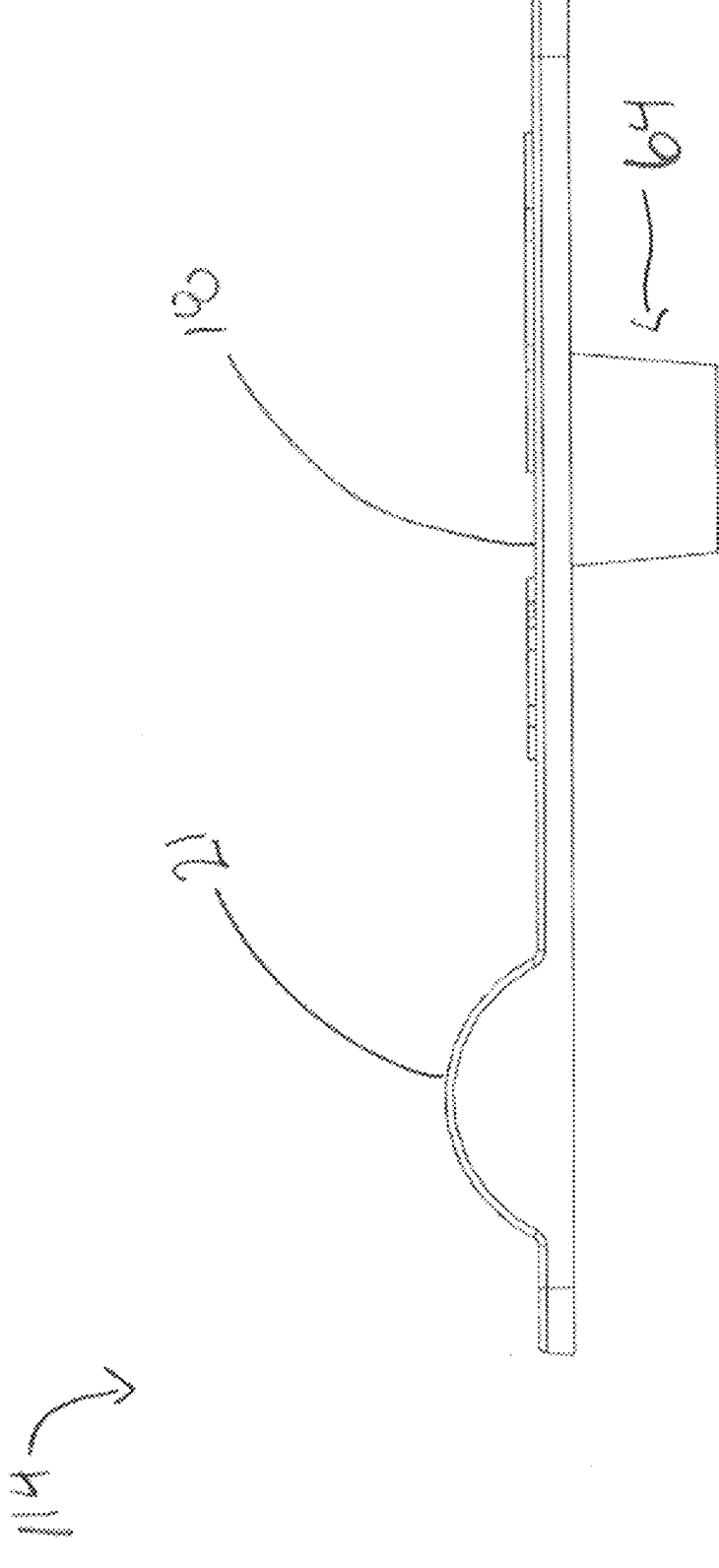
Figure 22:
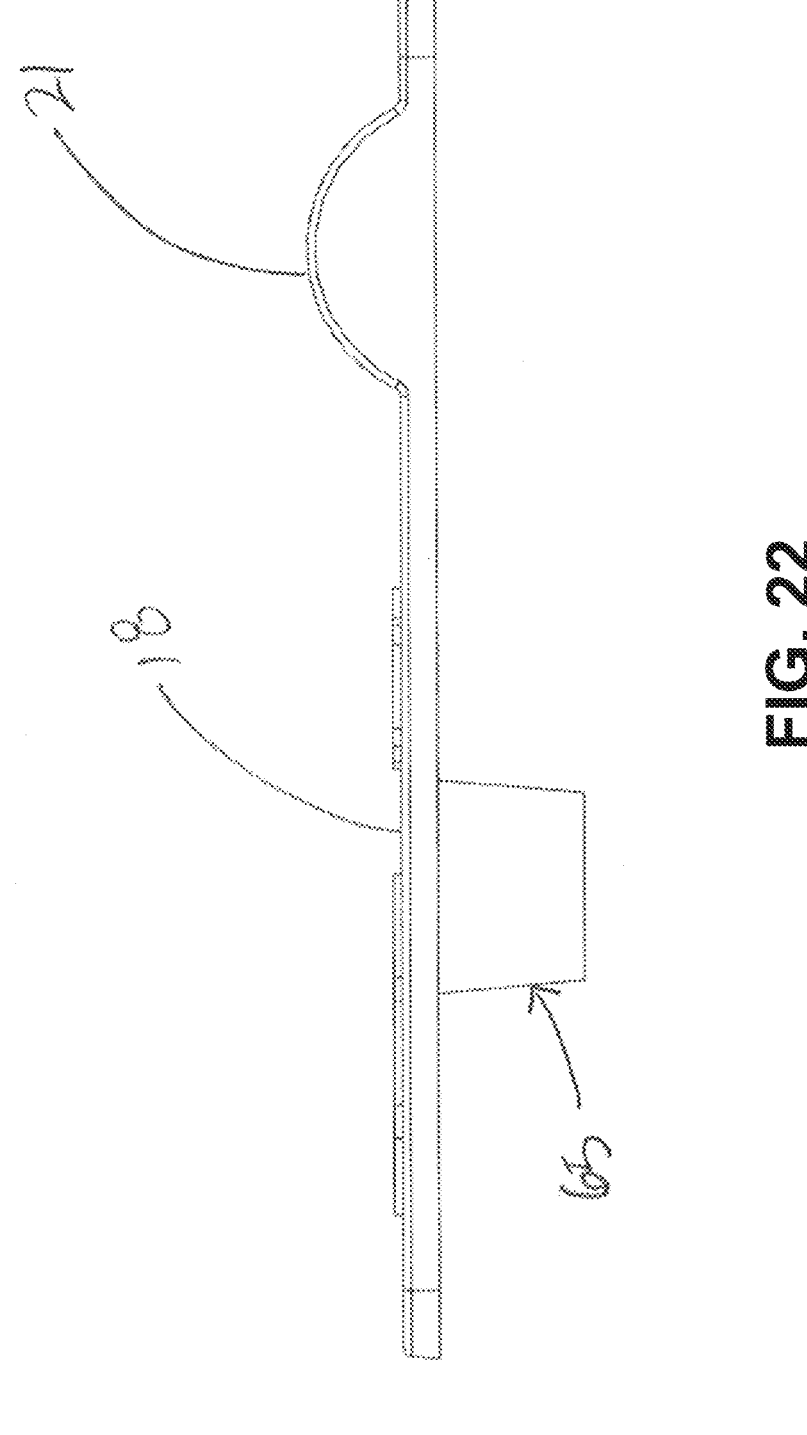
Figure 23:
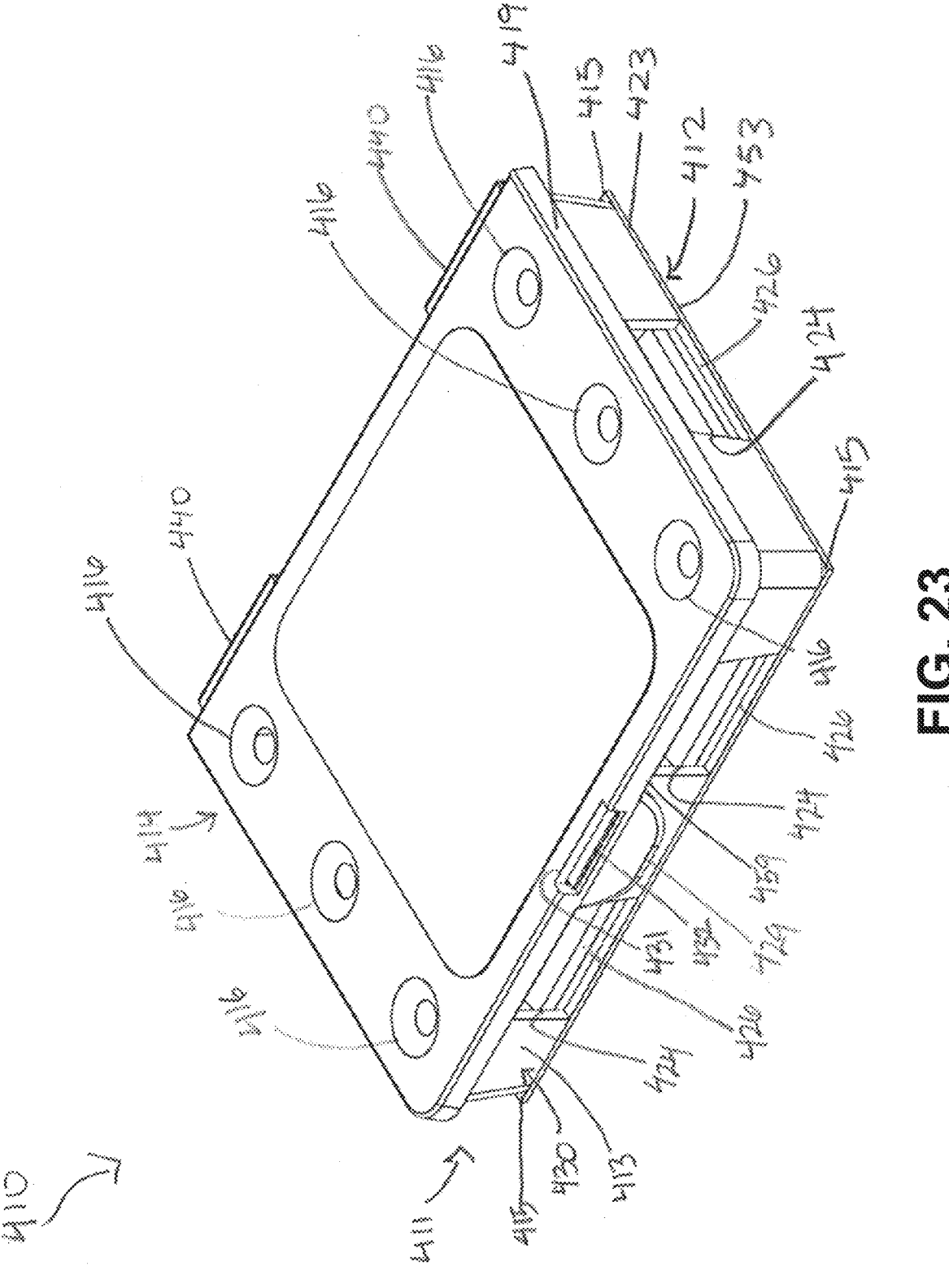
FIG. 23 is an isometric perspective view of a third embodiment of the present pest management apparatuses in the closed position.

As shown, for example, in FIG. 1, protrusion 21 of lid 14 comprises one or more openings 27 (e.g. four openings 27 shown in FIG. 1). Apparatus 10*a* also includes one or more tabs 28 (e.g., two, as shown, for example, in FIG. 2), each of which is at least partially disposed within recess 20. A portion of each tab may be inserted into opening 27 and a friction fit between the opening and such portion may be sufficient to keep the tab coupled to the lid. In other embodiments (not shown), the one or more tabs may be formed integrally with the lid. As shown in FIGS. 4 and 5, at least a portion of each tab 28 aligns with at least a portion of one of arch-shaped openings 24. This prohibits larger pests, such as rodents, from entering chamber 30 and coming into contact with adhesive layer 15. The tabs can be removed by a user—such as by pulling them out of openings in the lid in the embodiment shown in, e.g., FIGS. 1-8 or by twisting or bending them so as to break them off the lid in embodiments in which they are integrally formed with the lid—to allow larger pests such as rodents to enter the chamber, allowing the user to customize the apparatus for a particular type of use.

As shown, for example, in FIGS. 1, 2A, 4, and 5, lid 14 comprises a resilient lip 29 that extends from bottom edge 59 of at least a portion of lid sidewall 19. The lid, and more specifically the top edge of the lid, comprises a slit or opening 31. Sidewall 13, and more specifically a top edge portion of sidewall 13, comprises a portion (e.g., a projection) in the form of tooth 32 that extends away from chamber 30. Tooth 32 is configured to fit into slit 31 when the lid is in the closed position to help secure the lid to the base. Lid 14 comprises one or more protrusions 33. At least a portion of each of these protrusions contacts sidewall 13 when the lid is in the closed position. The configuration of each protrusion 33 and the configuration of lip 29 help to secure lid 14 to base 11 when lid 14 is in the closed position. As shown, lid sidewall 19 preferably extends around the front and left and right sides of lid 14.

Referring to FIGS. 9-16, shown is a pest management apparatus 10*b* that is substantially similar to apparatus 10*a*, the only exceptions being the configuration of the lid 14*b* and the absence of tabs 28. Lid 14*b* of apparatus 10*b* lacks one or more openings 27 of lid 14, and apparatus 10*b* lacks one or more tabs 28 of apparatus 10*a*.

In some embodiments of the present pest management apparatuses, the lid of the apparatus is coupled (and held) to the base of the apparatus via snap-on features. An example of such a lid is lid 114 shown in FIGS. 17-22. Lid 114 is configured to be coupled, and held, to sidewall 13 (and therefore base 11) with left and right tabs 64 and 65, respectively. Each of left and right tabs 64 and 65 includes a portion (64*a* and 65*a*, respectively) that extends downwardly from the underside of lid 114 and slightly inwardly toward the chamber formed when the lid and base are coupled together. Each of left tab 64 and right tab 65 also include another portion (tooth 36) that extends inwardly toward the chamber formed when the lid and base are coupled together (and optionally also slightly upwardly) such that each tooth 36 fits through one of polygon-shaped openings 25 and interferes with sidewall 13 to resist separation of the lid and the base when the two are pulled in opposite directions. Lid 114 has fewer openings 16 than does lid 14, but may have the same or more such openings in other embodiments. For example, in some embodiments, lid 114 comprises one or more rectangularly shaped openings 22 (e.g. two rectangularly shaped openings 22 shown on the alternate snap-on lid depicted in FIGS. 17-22). Further, while lid 114 is depicted without a hinge or hinge portion(s) (either a living hinge (having one or more living hinge portions integrally formed with corresponding living hinge portions of the sidewall) or hinge portion(s) separate from (but non-destructively removably couplable to) corresponding hinge portion(s) of the sidewall), lid 114 may include them in other embodiments; likewise, other embodiments of lid 14 may include tabs similar to (or the same as) left and right tabs 64 and 65.

Referring to FIGS. 23-32 shown therein and designated by the reference numeral 410 is another embodiment of the present pest management apparatuses.

Apparatus 410 comprises base 411 and lid 414 that is coupled to the base 411. Base 411 comprises (e.g., is formed by) floor 412 releasably coupled to sidewall 413. Floor 412 comprises substrate 423 to which adhesive layer 415 is permanently attached—in other words, floor 412 may take the form of a glue board. Substrate 423 has bottom surface 453 that comprises the bottommost surface of floor 412. As shown in the figures, the shape of the outer perimeter of adhesive layer 415 is the same as or similar to the shape of the outside of the bottom edge of sidewall 413, such that little if any portion of adhesive layer 415 sticks out past the outside of the bottom edge of sidewall 413 after sidewall 413 has been placed against (and releasably attached to) adhesive layer 415 of floor 412. Adhesive layer 415 is sufficiently sticky that after sidewall 413 is releasably attached thereto, sidewall 413 and any lid attached to sidewall 413 will remain attached to floor 412 during normal use of apparatus 410 (e.g., during shipment and placement of the apparatus 410 in a desired location for catching pests) but may be removed from floor 412 after the desired use is complete (e.g., after a sufficient number of pests have been caught via adhesive layer 415) and apparatus 410 is replaced with a new floor 412 and re-used. Adhesive layer 415 may be configured to attract and immobilize pests such that pests (e.g., insects, mice, and/or rats) that enter apparatus 410 through an opening of base 411 thereof and travel onto the adhesive of floor 412 become trapped thereon. Lid 414 is coupled to base 411 with a living hinge having multiple living hinge portions 440 such that lid 414 is moveable relative to base 411 between closed and open positions (see, e.g., FIGS. 23-24A). In other embodiments (not shown), the lid and sidewall may be coupled with a hinge having multiple hinge portions that involve lid and sidewall portions that couple together through a snap-fit or the like but are not molded together to form a living hinge. Sidewall 413 is preferably molded from a suitable plastic material as an integral unit. In the closed position, base 411 and lid 414 cooperate to define chamber 430 (see, e.g., FIG. 23).

Lid 414 comprises one or more openings 416 (e.g., six openings 416) that begin at inner surface 417 of lid 414 and progressively expand outward in diameter to top surface 418 of lid 414. The funnel shape of openings 416 is configured to better direct insects into apparatus 410 generally and chamber 430 specifically than if the openings had the same shapes in both the inner and top surfaces of the lid. Lid 414 comprises lid sidewall 419 spanning the front and left and right sides of the lid, but not the back.

Figure 24A:
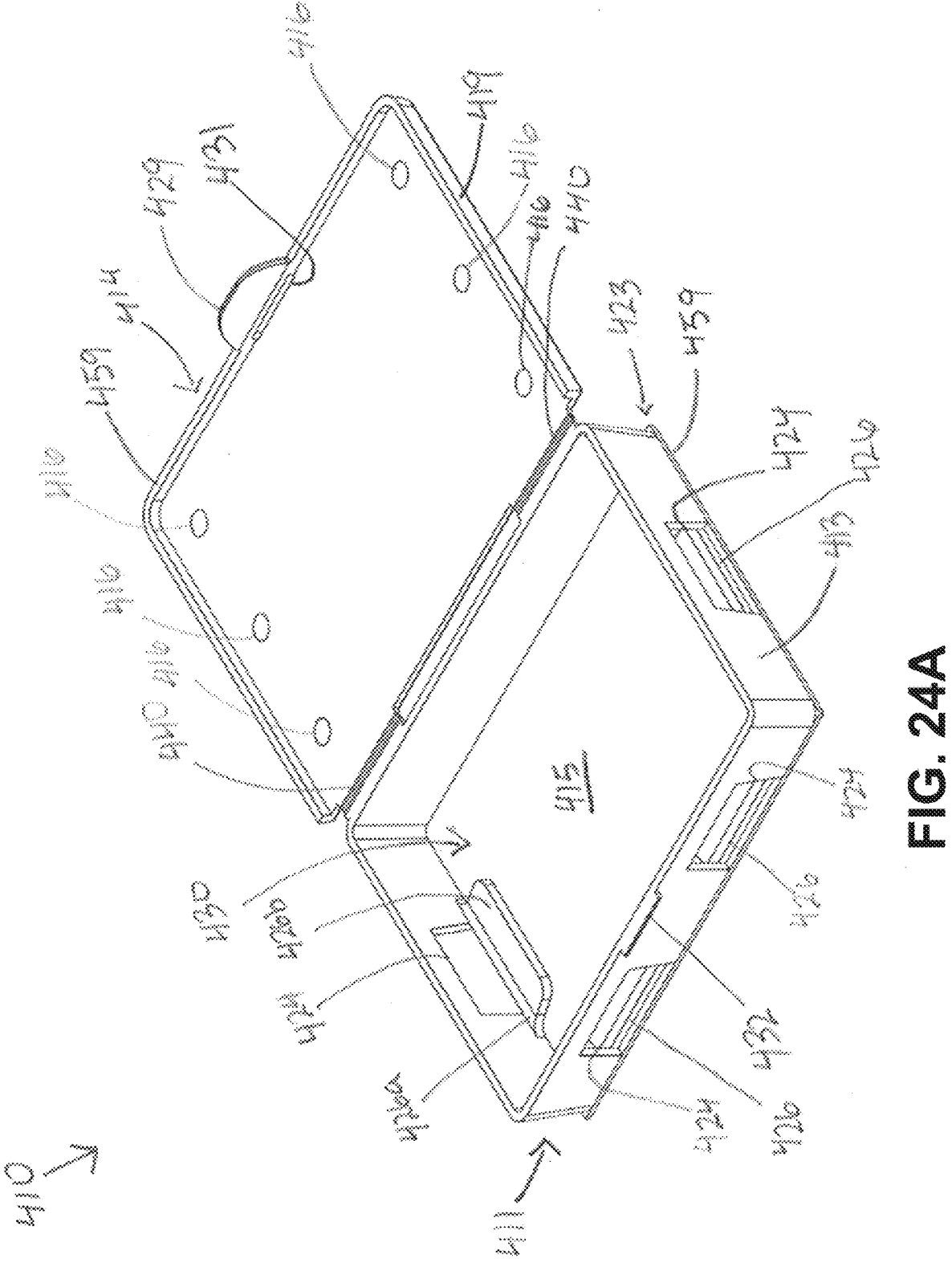
FIG. 24A is an isometric perspective view of a third embodiment of the present pest management apparatuses in the open position.
Figure 24B:
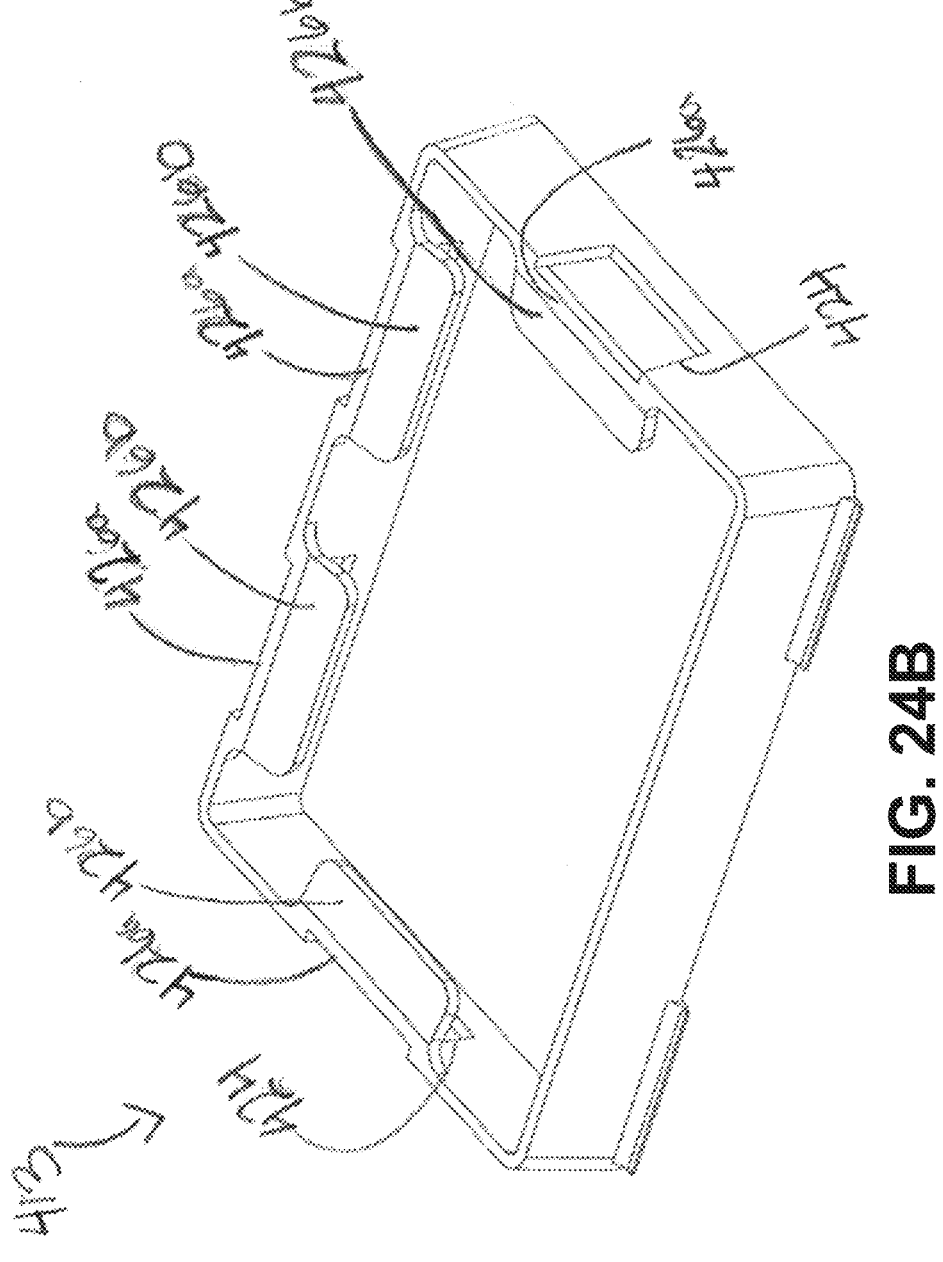
FIG. 24B is a bottom perspective view of the sidewall of apparatus of FIG. 24A.
Figure 25:
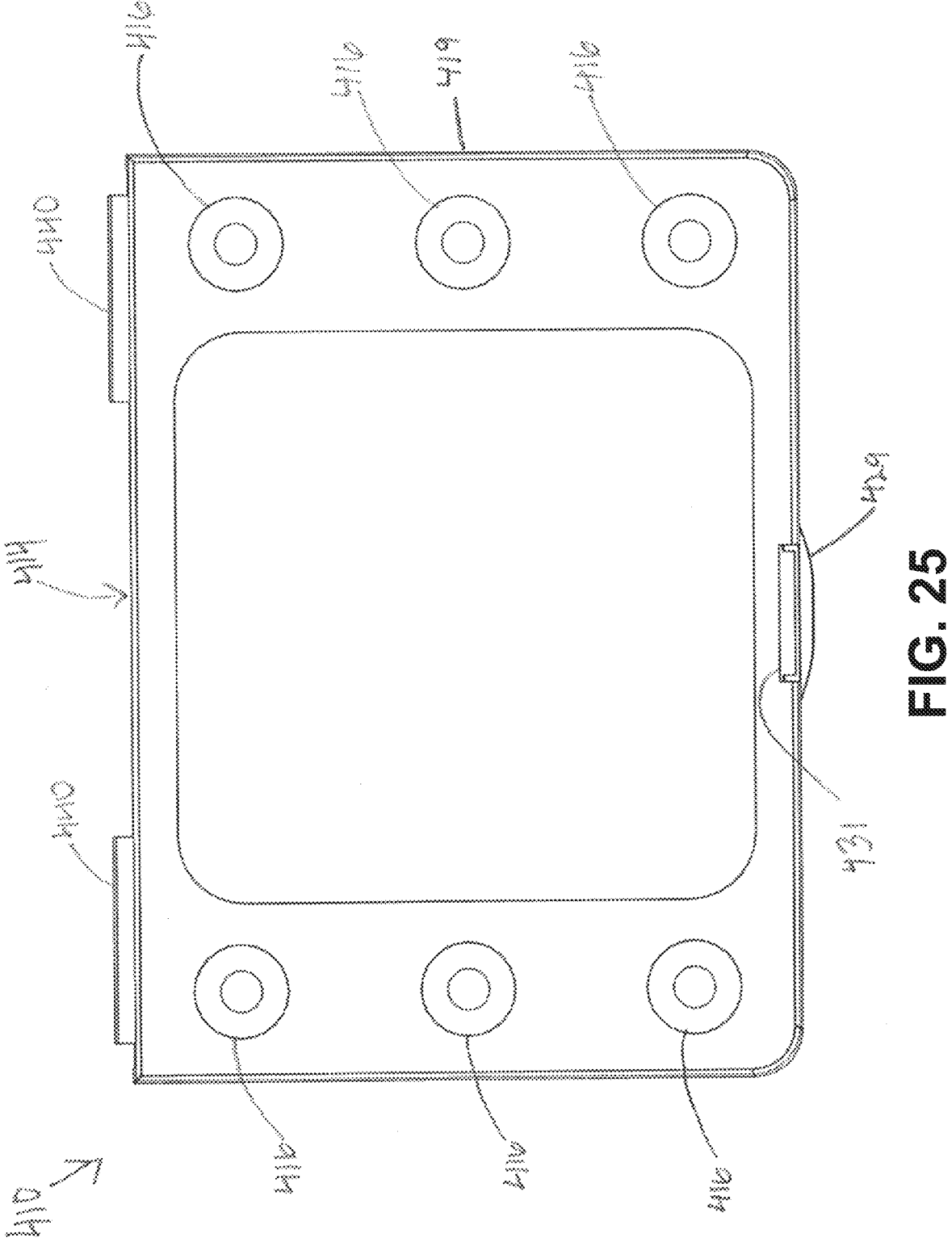
FIG. 25 is a top view of the apparatus in FIG. 23 in the closed position.
Figure 26:
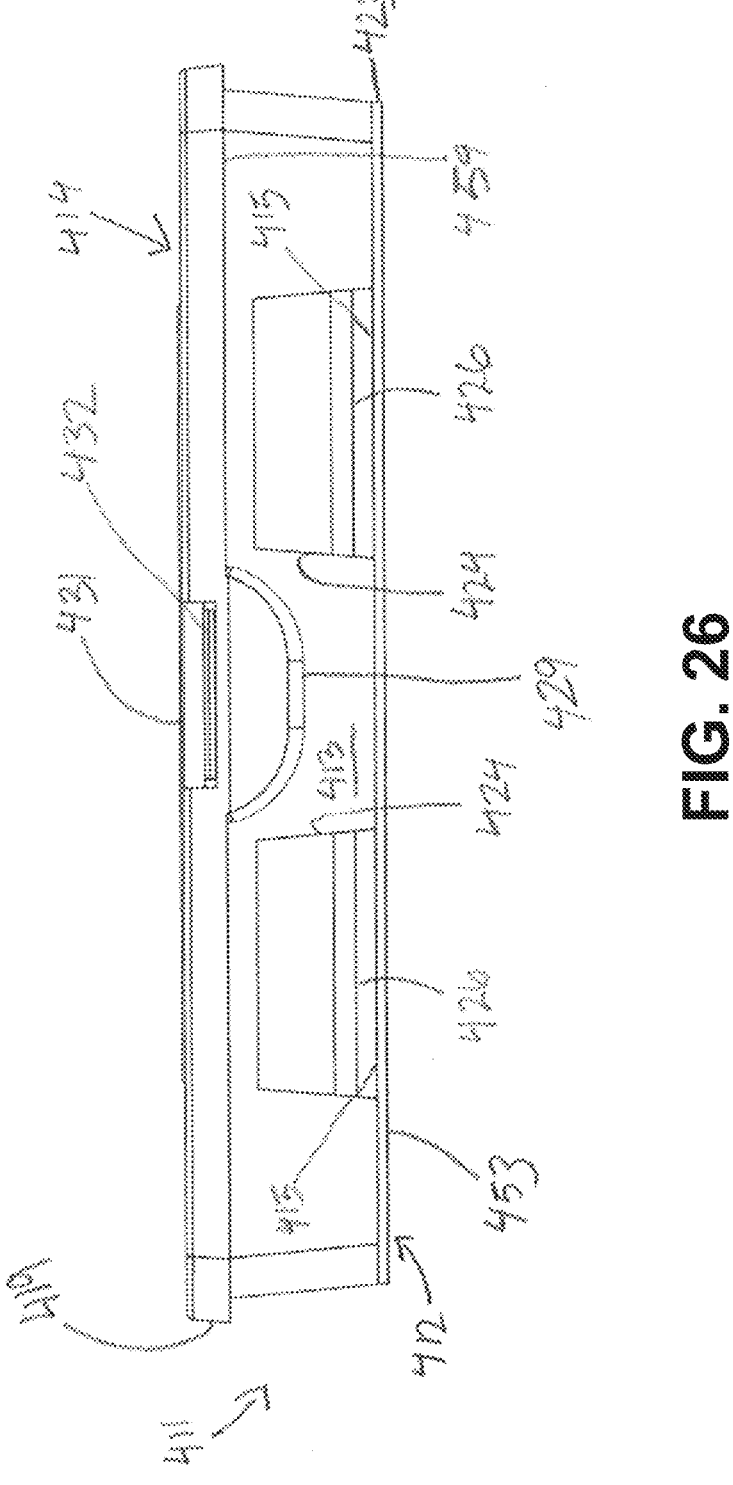
FIGS. 26-29 are front, back, left, and right views, respectively, of the apparatus of FIG. 23.
Figure 27:
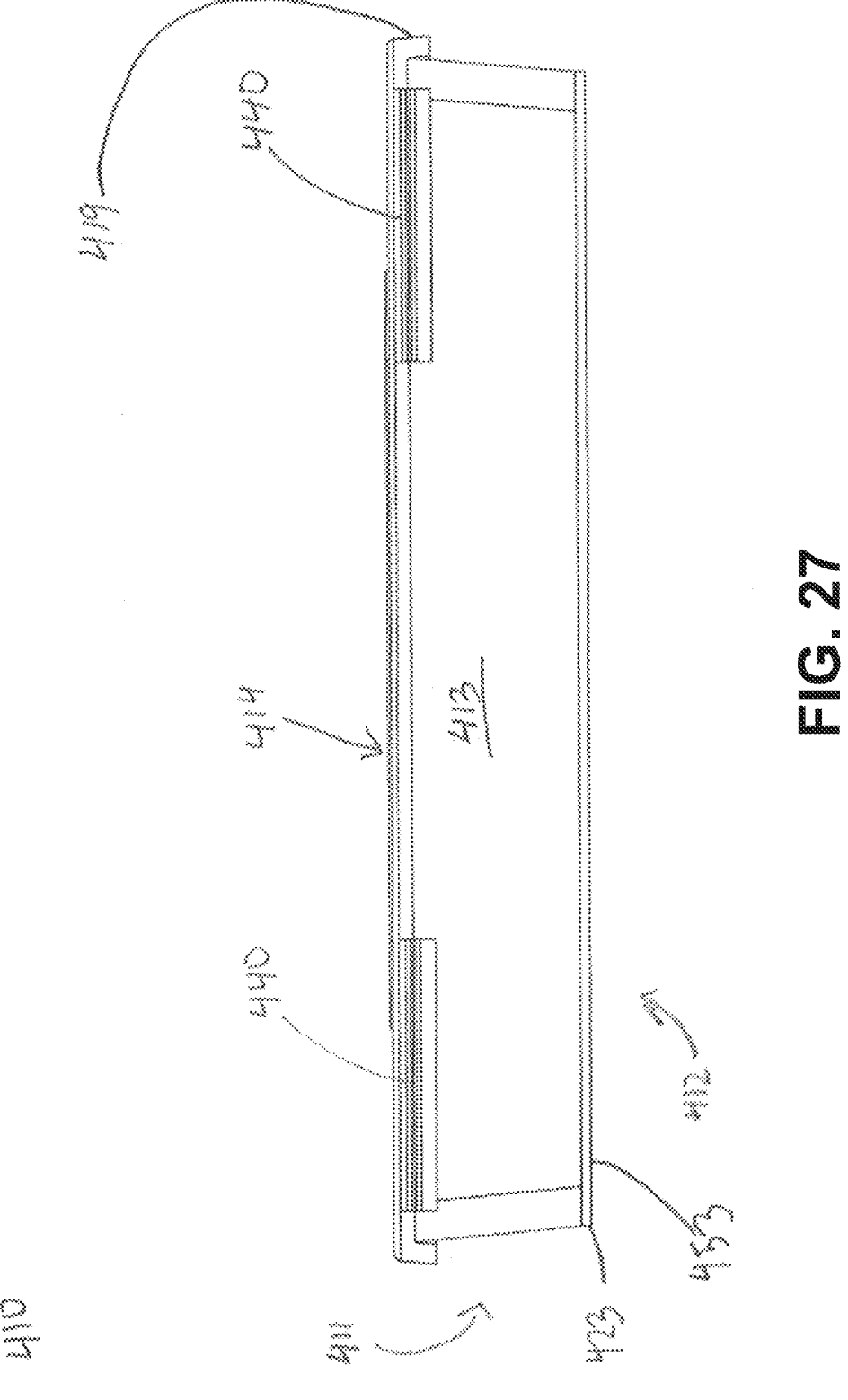
Figure 28:
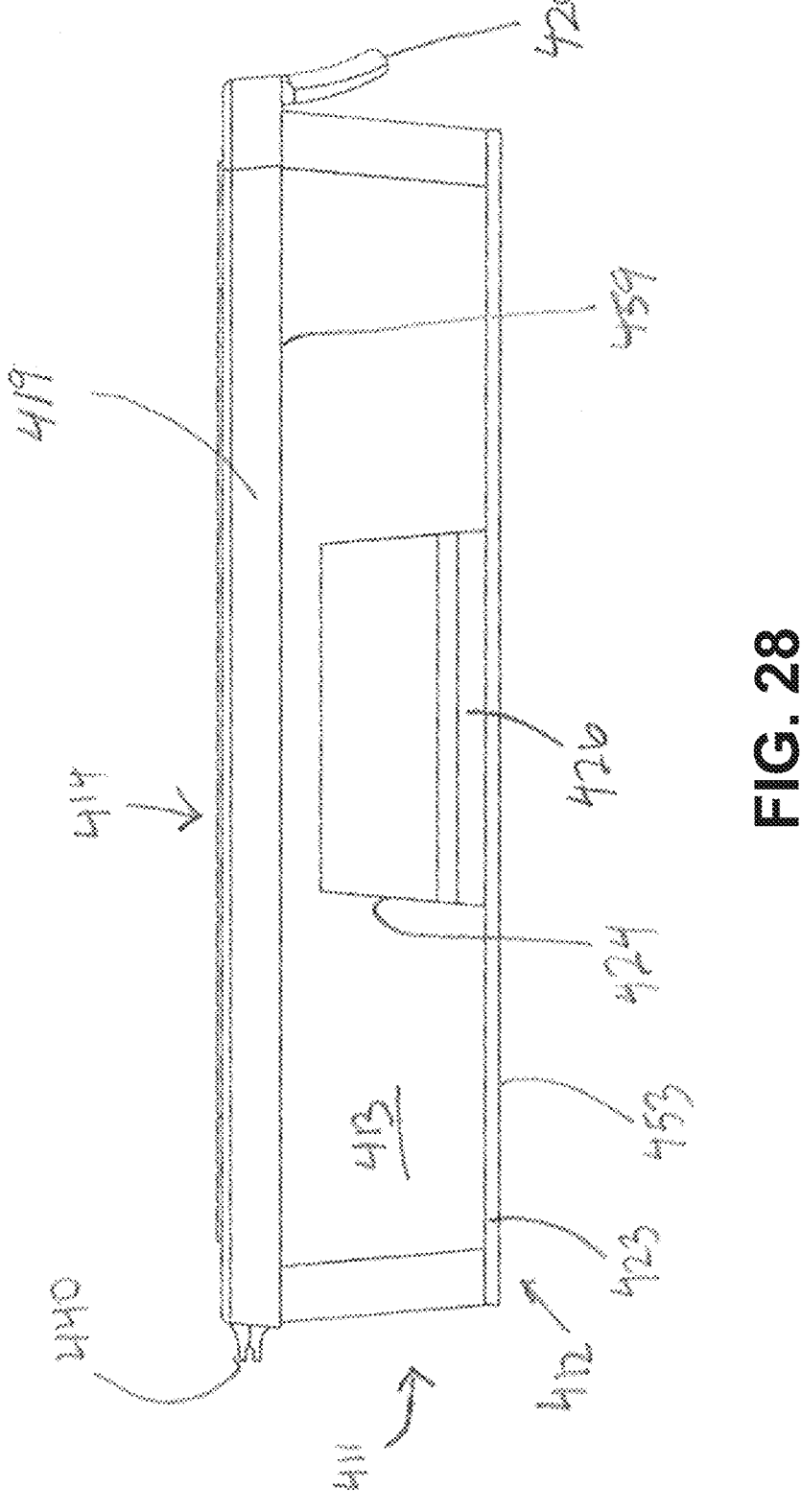
Figure 29:
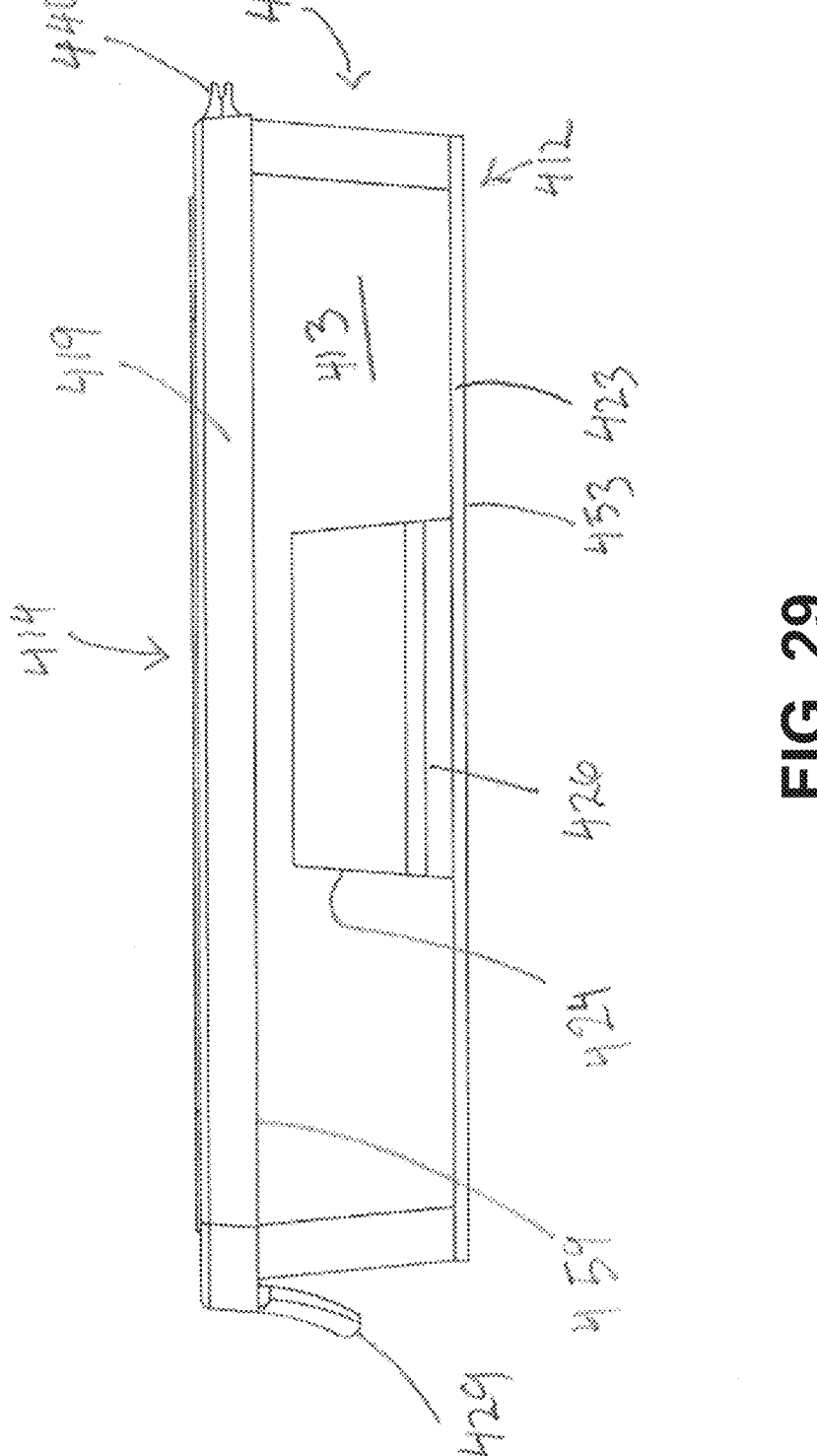
Figure 30:
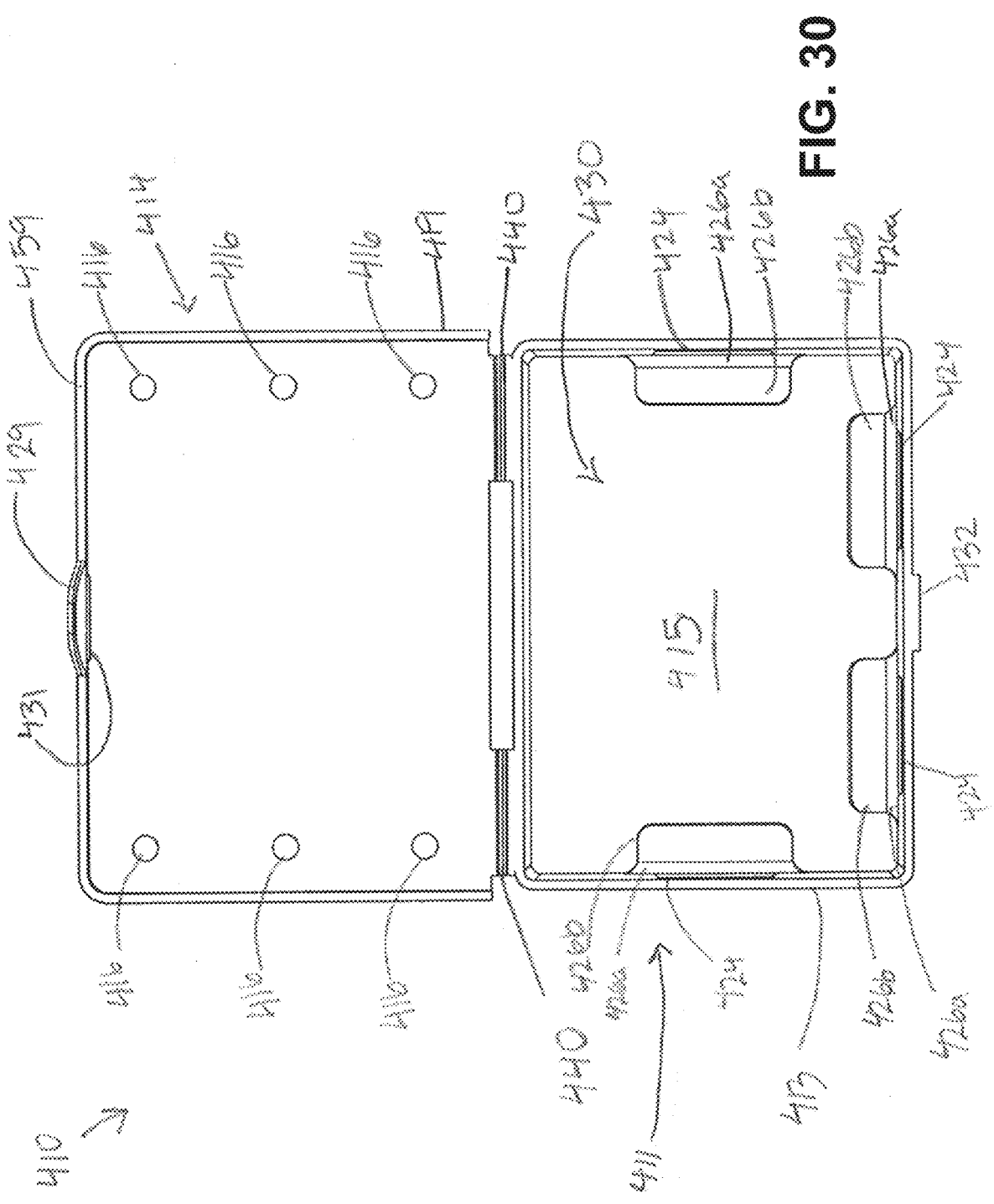
FIG. 30 is a top view of the apparatus of FIG. 23 in the open position.
Figure 31:
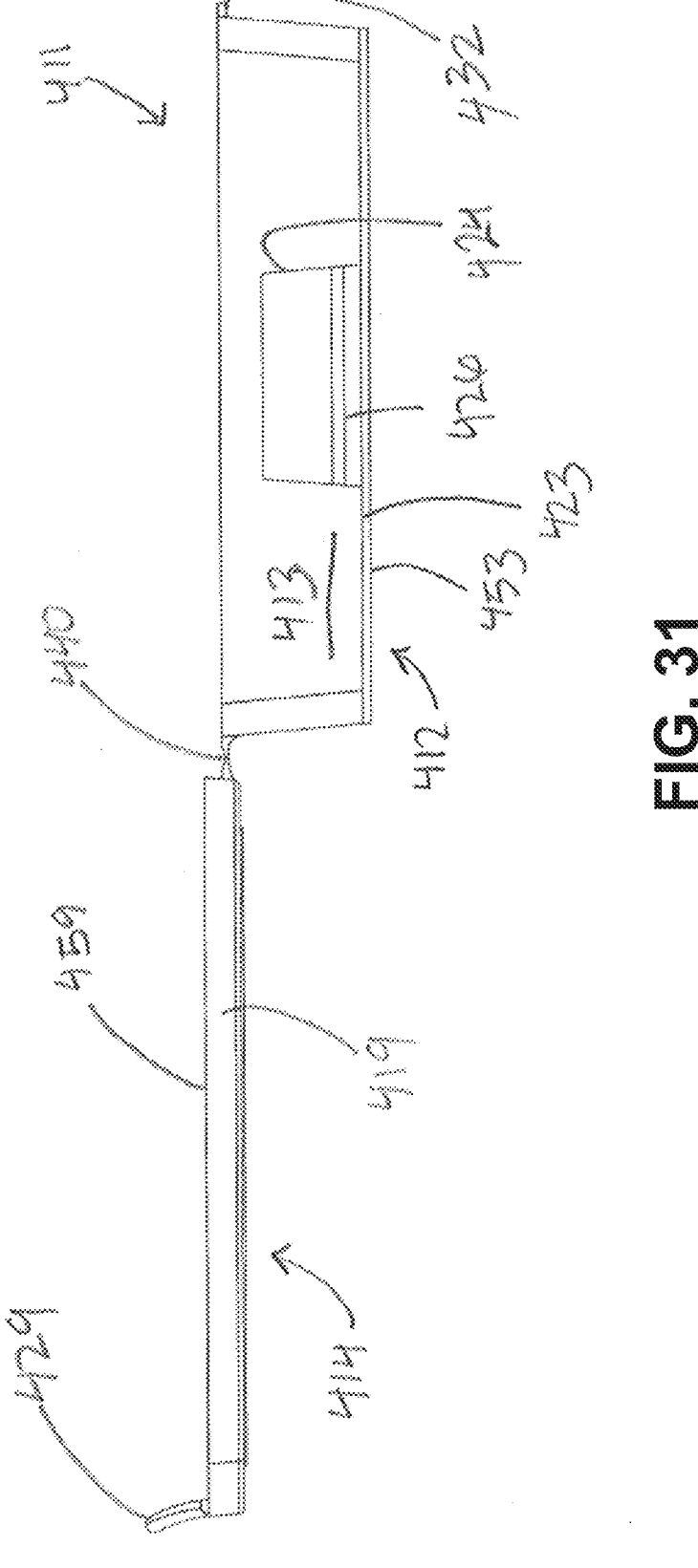
FIGS. 31-32 are left and right views, respectively, of the apparatus of FIG. 23 in the open position.
Figure 32:
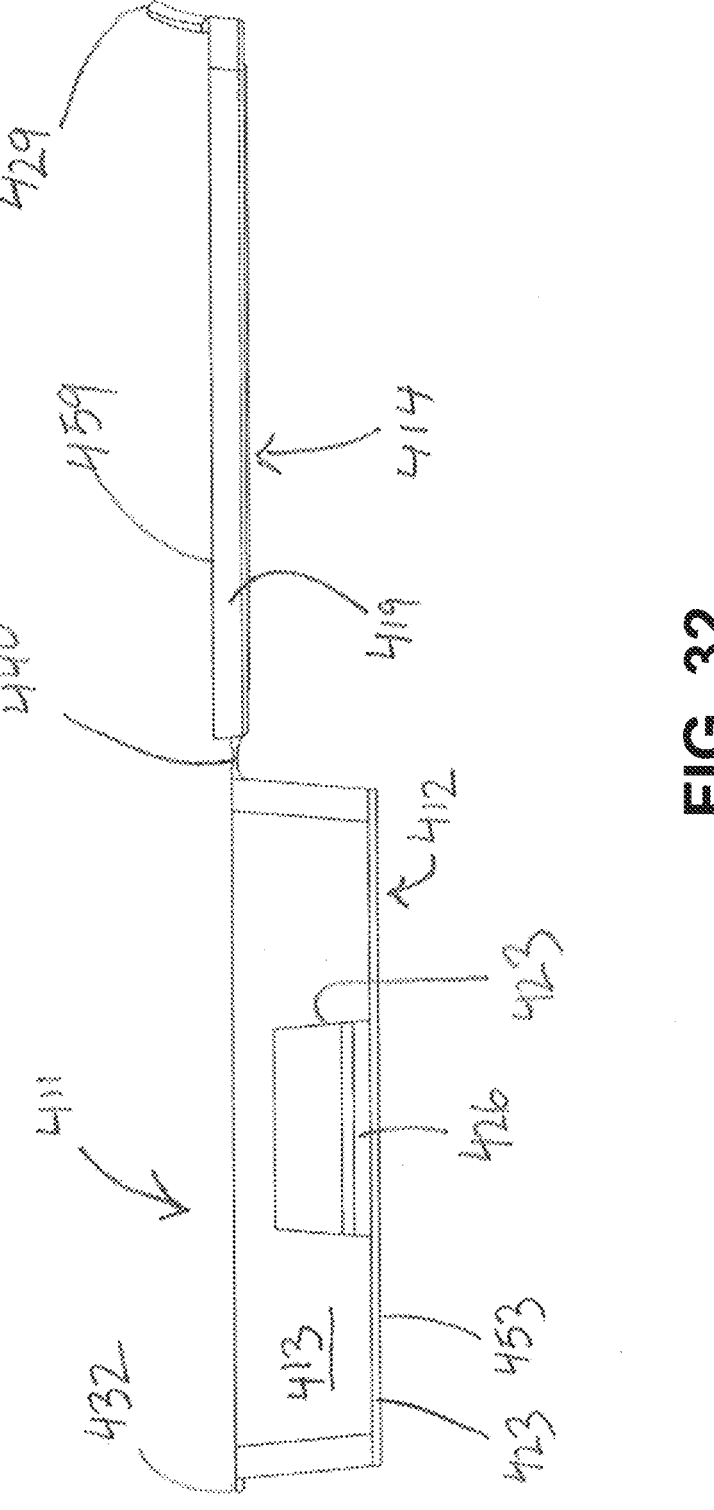

Base 411 comprises one or more openings 424, defined at least in part by sidewall 413 (e.g., four openings as shown in, e.g., FIG. 24). Sidewall 413 comprises multiple inwardly-extending tabs 426 such that each tab is disposed within chamber 430 when the sidewall is coupled to the floor and the lid is in the closed position (e.g., apparatus 410 includes four such tabs). Each of the tabs is positioned at a lowermost portion of an opening 424. Each inwardly-extending tab 426 has a tab bottom surface and at least a portion of the tab bottom surfaces are co-planar with each other (see e.g., FIG. 24B). Each of the tabs positioned at a lowermost portion of an opening 424 has first (e.g., proximal) portion 426a having a tab bottom surface that is in contact with floor 412 and serves to keep the sidewall secured to the adhesive layer of the floor, and second (e.g., distal) portion 426b that extends away from floor 412 (e.g., at a non-vertical angle to the floor) such that the tab bottom surface of portion 426b does not touch floor 12. As reflected in, e.g., FIG. 30, the bottom of each of the openings 424 is floor 412 and, more specifically, adhesive layer 415 of the floor.

As shown, for example, in FIGS. 23, 24, 26, 28, and 29, lid 414 comprises a resilient lip 429 that extends from bottom edge 459 of at least a portion of lid sidewall 419. The lid, and more specifically the top edge of the lid, comprises a slit or opening 431. Sidewall 413, and more specifically a top edge portion of sidewall 413, comprises a portion (e.g., a projection) in the form of tooth 432 that extends away from chamber 430. Tooth 432 is configured to fit into slit 431 when the lid is in the closed position to help secure to the lid to the base. As shown, lid sidewall 419 preferably extends around the front and left and right side of lid 414.

Figure 33A:
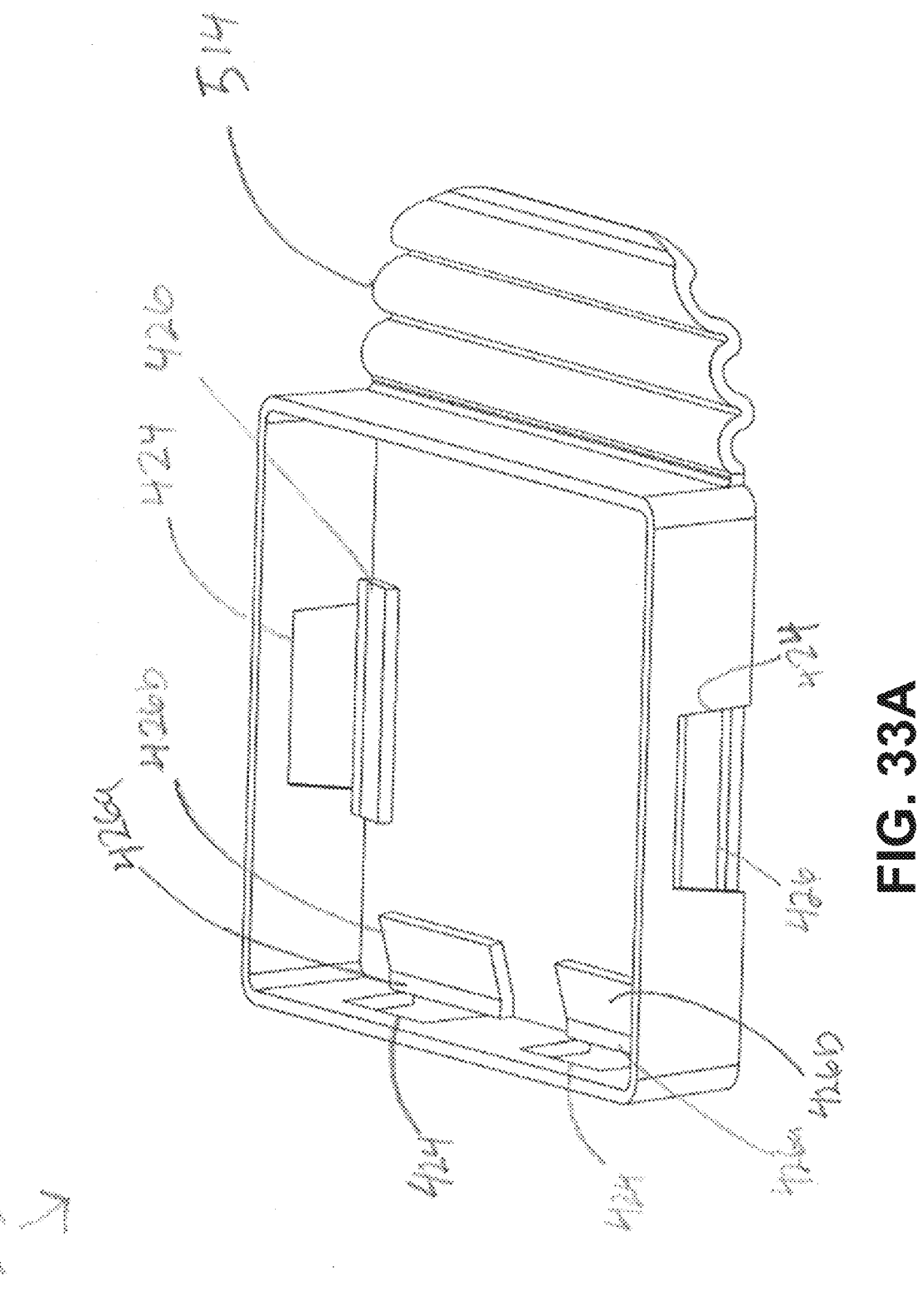
FIG. 33A is an isometric perspective view of an alternate sidewall of the third embodiment of the pest management apparatus.
Figure 33B:
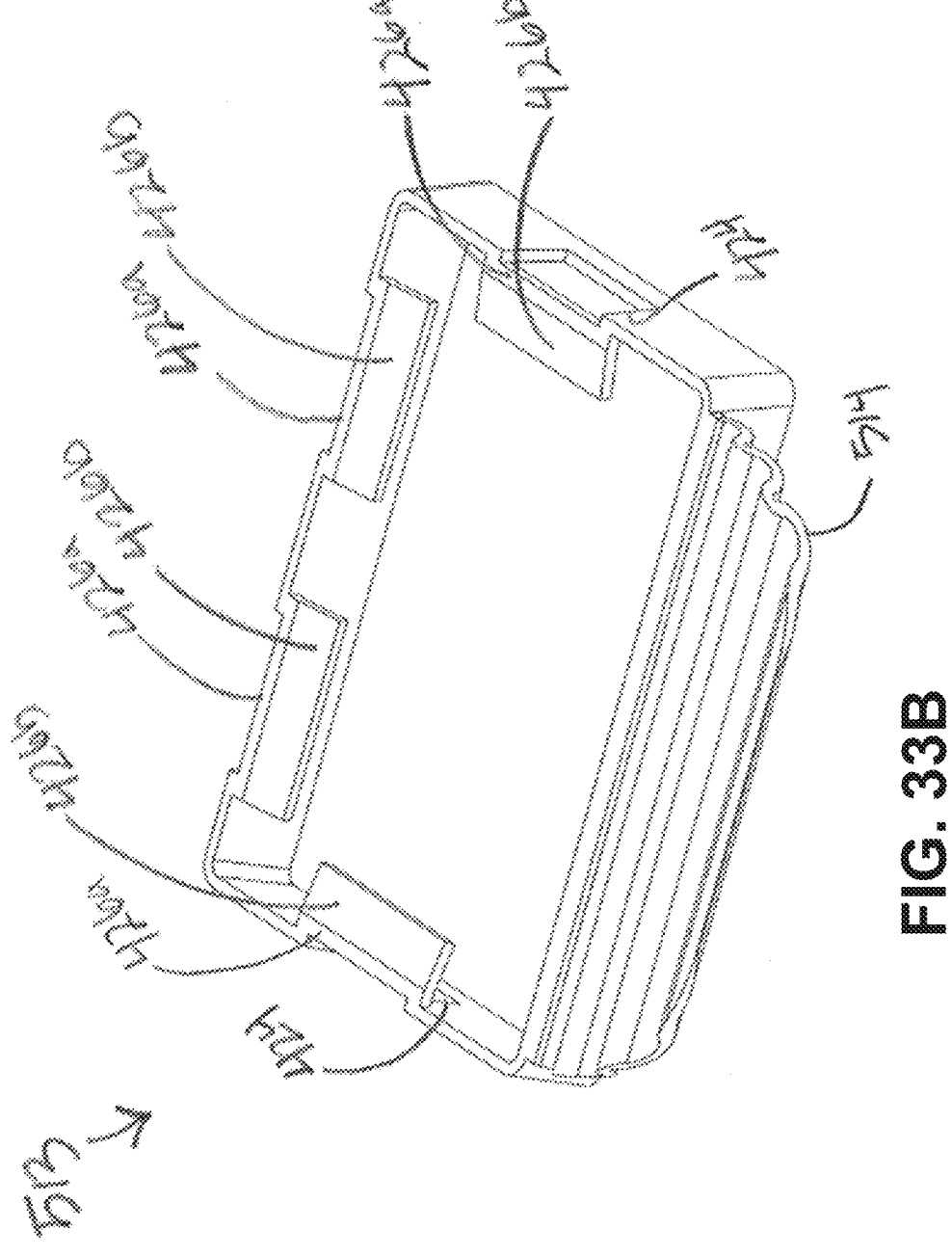
FIG. 33B is a bottom perspective view of the alternate sidewall of FIG. 33A.
Figure 34:
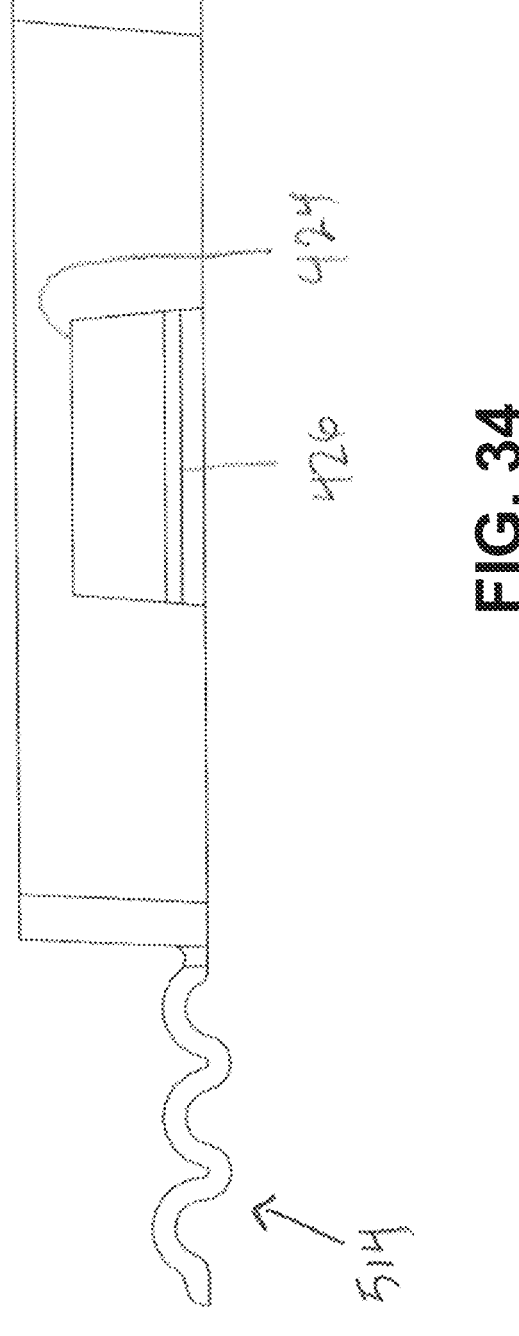
FIG. 34 is a side view of the sidewall of FIG. 33.
Figure 35:
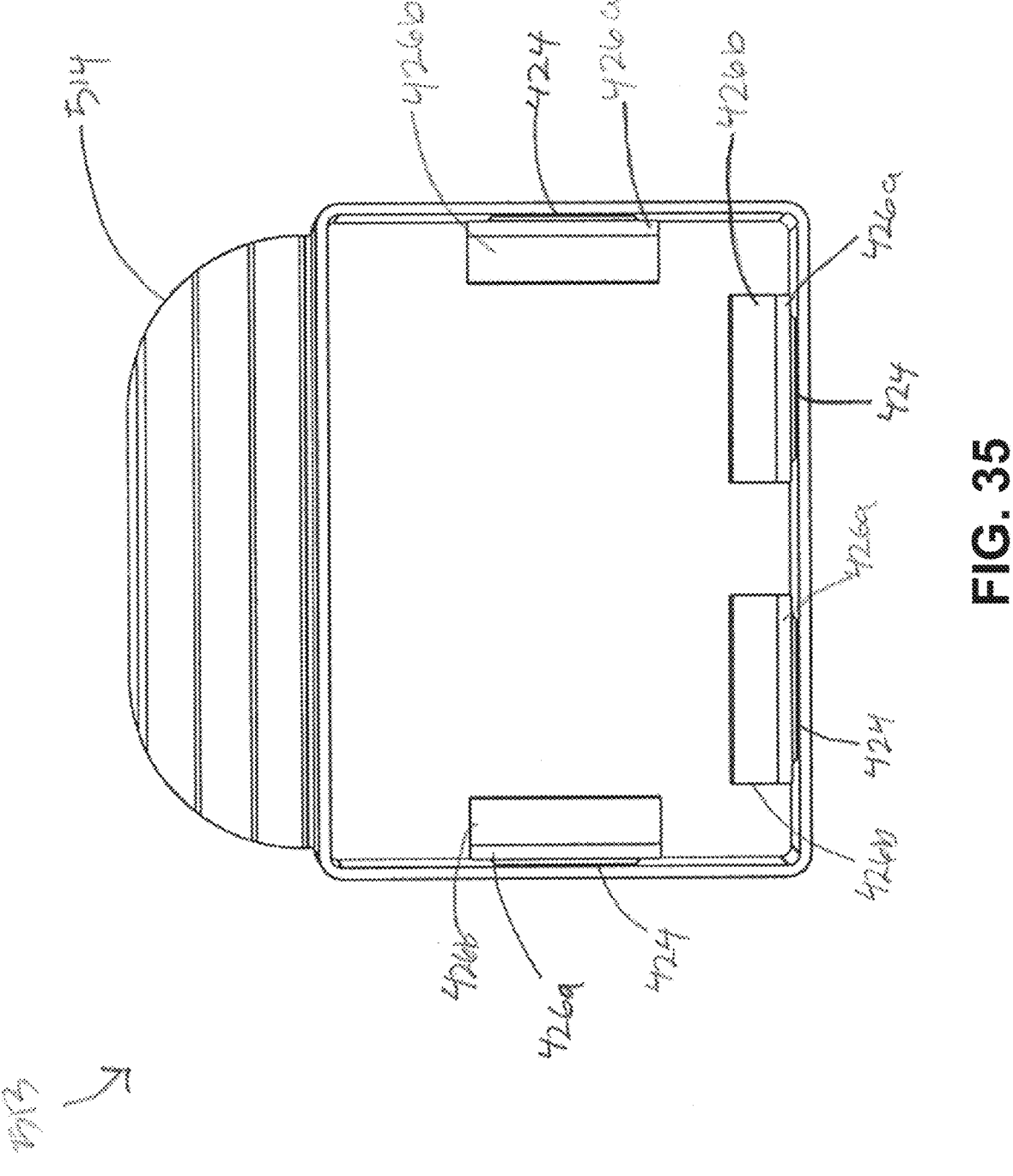
FIG. 35 is a top view of the sidewall of FIG. 33.

In some embodiments of the present pest management apparatuses, the sidewall of the apparatus comprises handle 514. An example of such a sidewall is sidewall 513 shown in FIGS. 33-35. Sidewall 513 comprises handle 514 that extends laterally away from chamber 430 (e.g. handle 514 on sidewall of third embodiment depicted in FIGS. 33-35). Handle 514 may be nonlinear or have a wave-like shape and is not positioned above or below floor 412. Sidewall 513 is configured to be coupled to lid 414 (not depicted in FIGS. 33-35) and adhered to floor 412, and, more specifically, to adhesive layer 415 attached to substrate 423 of floor 412 (not depicted in FIGS. 33-35).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the apparatuses and methods are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A pest management apparatus comprising:
   a floor comprising a substrate having a first surface to which an adhesive layer is permanently attached, and a second surface opposite the first surface;
   a sidewall surrounding an interior region, the sidewall including a bottom edge and multiple inwardly-extending tabs, each tab having a tab bottom surface and at least a portion of each of the tab bottom surfaces being co-planar with each other, the sidewall being releasably couplable to the floor so as to form a base with the second surface of the substrate defining an exterior surface of the apparatus; and
   a lid coupled to the sidewall;
   wherein the lid and the base cooperate to form a chamber that includes the interior region.

2. The apparatus of claim 1, wherein the adhesive layer is configured to attract pests.

3. The apparatus of claim 1, wherein the lid comprises a lid sidewall.

4. The apparatus of claim 3, wherein the lid sidewall comprises a left lid sidewall and a right lid sidewall.

5. The apparatus of claim 1, wherein an inner surface of the lid comprises a recess extending from a right lid sidewall to a left lid sidewall.

6. The apparatus of claim 5, wherein a top surface of the lid comprises a protrusion corresponding to the recess.

7. The apparatus of claim 1, wherein the sidewall defines at least in part one or more arch shaped openings.

8. The apparatus of claim 1, wherein the sidewall comprises a left sidewall and a right sidewall.

9. The apparatus of claim 8, wherein the right sidewall defines at least in part a first polygon shaped opening and the left sidewall defines at least in part a second polygon shaped opening.

10. The apparatus of claim 9, wherein each of the multiple inwardly-extending tabs is positioned at a lowermost portion of one or more arch-shaped openings defined by the sidewall, the first polygon shaped opening, or the second polygon shaped opening such that at least a portion of the tab bottom surface touches the floor.

11. The apparatus of claim 10, wherein at least a portion of the tab bottom surface does not touch the floor.

12. The apparatus of claim 1, wherein the lid comprises a left tab and a right tab.

13. The apparatus of claim 12, wherein each of the right and left tabs comprise a distal portion having a tooth that extends longitudinally towards the interior region.

14. The apparatus of claim 13, wherein each tooth is configured to fit through at least one of two or more polygon-shaped openings defined by the sidewall such that the tooth interferes with the sidewall to resist separation of the lid and the sidewall in response to pulling the lid and the sidewall in opposite directions.

15. The apparatus of claim 1, wherein the lid is coupled to the sidewall such that the lid is moveable relative to the base from an open position to a closed position.

16. The apparatus of claim 1, wherein a top edge portion of the sidewall comprises a tooth that extends away from the chamber.

17. The apparatus of claim 1, wherein an inner surface of the lid comprises one or more protrusions, and the one or more protrusions and the sidewall are configured to secure the lid to the sidewall.

18. The apparatus of claim 1, wherein the lid comprises one or more frangible tabs at least partially disposed within a recess.

19. The apparatus of 18, wherein at least a portion of each of the one or more frangible tabs aligns with at least a portion of one of one or more arch-shaped openings defined by the sidewall.

20. The apparatus of claim 1, wherein the sidewall comprises a handle that extends laterally away from the interior region.

* * * * *